United States Patent
Bafna et al.

(10) Patent No.: US 12,547,520 B2
(45) Date of Patent: Feb. 10, 2026

(54) INTELLIGENT LOAD TEST SYSTEM

(71) Applicant: Chime Financial, Inc., San Francisco, CA (US)

(72) Inventors: Rachna Bafna, San Francisco, CA (US); Joshua Sacks, Seattle, WA (US); Ram Daga, San Jose, CA (US); Clinton Williams, Naperville, IL (US)

(73) Assignee: Chime Financial, Inc., San Francisco, CA (US)

( * ) Notice: Subject to any disclaimer, the term of this patent is extended or adjusted under 35 U.S.C. 154(b) by 477 days.

(21) Appl. No.: 18/160,003

(22) Filed: Jan. 26, 2023

(65) Prior Publication Data

US 2024/0256417 A1    Aug. 1, 2024

(51) Int. Cl.
*G06F 11/34* (2006.01)
*G06F 3/0481* (2022.01)
*G06F 3/04847* (2022.01)
*G06F 11/30* (2006.01)

(52) U.S. Cl.
CPC ........ *G06F 11/3414* (2013.01); *G06F 3/0481* (2013.01); *G06F 3/04847* (2013.01); *G06F 11/3006* (2013.01); *G06F 11/3447* (2013.01); *G06F 11/3457* (2013.01)

(58) Field of Classification Search
CPC ............... G06F 11/3414; G06F 3/0481; G06F 3/04847; G06F 11/3006; G06F 11/3447; G06F 11/3457; G06F 11/3433
See application file for complete search history.

(56) References Cited

U.S. PATENT DOCUMENTS

| | | | |
|---|---|---|---|
| 2022/0237107 A1* | 7/2022 | Subbunarayanan | ......................... G06F 11/3414 |
| 2023/0195596 A1* | 6/2023 | Mazumdar | .......... G06F 11/3433 717/131 |
| 2023/0418722 A1* | 12/2023 | Aird | ..................... G06F 11/3698 |
| 2024/0106731 A1* | 3/2024 | Ramesh | .................. H04L 41/16 |
| 2024/0143414 A1* | 5/2024 | Ramanujan | .......... G06N 3/0455 |

OTHER PUBLICATIONS

"Apache Jmeter", Apache Software Foundation, 2024, 2 pages, [online], [Retrieved on Jul. 3, 2025], Retrieved from the Internet, <URL: https://jmeter.apache.org/>.
"Modern monitoring & security," Datadog, Dec. 31, 2022, 5 pages, webpage <https://www.datadoghq.com/>, Retrieved from Internet Archive Wayback Machine <https://web.archive.org/web/20221231004232/https://www.datadoghq.com/> on Jul. 3, 2025.

(Continued)

*Primary Examiner* — Thomas M Hammond, III
(74) *Attorney, Agent, or Firm* — Keller Preece PLLC

(57) ABSTRACT

The present disclosure relates to systems, non-transitory computer-readable media, and methods for generating computing-resource metrics based on limited user inputs provided through user interaction with a graphical user interface and then performing a system load test simulating system performance. In particular, in one or more embodiments, the disclosed systems provide a graphical user interface that requires limited user input to generate a load test that can determine computing-resource metrics based on user input of a load test script, test dataset, target throughput metric, and a load metric.

20 Claims, 14 Drawing Sheets

(56) References Cited

OTHER PUBLICATIONS

"Scalable software starts here," Flood, Dec. 5, 2022, 3 pages, webpage <https:/www.flood.io/>, Retrieved from Internet Archive Wayback Machine <https://web.archive.org/web/20221205041231/https:/www.flood.io/> on Jul. 3, 2025.

"The Complete Continuous Testing Platform," BlazeMeter, Dec. 13, 2022, 3 pages, webpage <https:/www.blazemeter.com/>, Retrieved from Internet Archive Wayback Machine <https://web.archive.org/web/20221213082116/https:/www.blazemeter.com/> Jul. 3, 2025.

* cited by examiner

INTELLIGENT LOAD TEST SYSTEM

BACKGROUND

Recent years have seen significant improvements in performing load tests to model a computer system's performance under different situations based on simulating multiple users accessing the system. For example, conventional performance modeling systems can measure a system's performance based on different parameters and load patterns and provide both hardware and software statistics. To illustrate, conventional systems can accept system performance parameters, model system performance, and generate a performance modeling report. Despite recent advances, however, existing systems continue to exhibit a number of drawbacks or deficiencies, particularly with regard to efficiency, flexibility, and functionality.

As just suggested, conventional performance modeling systems are inefficient. In particular, to establish performance modeling parameters and determine or change corresponding values, conventional systems often require client devices to proceed through a variety of different graphical user interfaces. In particular, conventional systems often require user interactions and navigation across excessive graphical user interfaces to capture sufficient digital information to generate a performance model or change and/or modify performance modeling values. Thus, conventional systems utilize processes and graphical user interfaces that increase the overall burden on implementing devices and result in longer interaction times and additional computational burdens on the implementing devices.

Furthermore, many conventional systems are inflexible and fail to accurately identify relationships between various performance metrics and the system environment. Consequently, many conventional systems require a long list of metrics to be provided by the client device when performing performance modeling. Conventional systems often cannot integrate multiple applications and tools to determine the input metrics for performance monitoring. Because of the limits of conventional systems, current performance modeling systems can require client devices to perform additional steps to provide additional input metrics and cause needless user interactions with the system. Moreover, in many cases, running performance tests in this manner is also time consuming for the computing devices, results in an excessive number of steps executed by the computing devices, and necessitates using additional computing resources.

Similar to the above-discussed disadvantages, conventional performance modeling systems often provide only limited functionality with regard to designing a load test. More specifically, conventional systems often use inconvenient and generic methods to gather load test input metrics from a client device. Indeed, conventional performance modeling systems often require an excessive, and avoidable, number of standardized inputs to generate performance monitoring insights from input data. Indeed, in many cases, conventional systems make unwarranted assumptions and require unnecessary input metrics creating a system that is cumbersome, confusing, and difficult to navigate.

These along with additional problems and issues exist with regard to conventional performance modeling systems.

BRIEF SUMMARY

This disclosure describes one or more embodiments of systems, methods, and non-transitory computer readable storage media that provide and/or solve one or more of the foregoing or other problems in the art. In particular, the disclosed systems provide a user-friendly graphical user interface to input simple load test metrics that the systems may use to automatically determine computing-resource metrics and simulate system performance in a load test. For instance, the disclosed systems can efficiently perform load tests for a target computing system based on receiving input in a graphical user interface identifying a load test script, a test dataset, a target throughput metric, and/or a load metric. Based on limited user interactions with the graphical user interface, the disclosed systems can determine computing resource metrics corresponding to the target throughput metric and the load metric and perform a load test on the system. Having run the load test, the disclosed systems can display load-test metrics indicating the degree to which a target computing system passes or fails the generated load test.

The disclosed systems can provide a more efficient manner of limiting information required from the user by consolidating the required input metrics in compact graphical user interfaces. Unlike the disjointed and isolated applications of some conventional performance modeling systems, the disclosed systems can integrate multiple applications and/or tools to determine the input metrics for performance monitoring. In addition to improved user-interface navigation and integration, the disclosed systems can provide a new computational model to efficiently perform a load test and automatically determine computing-resource metrics in real time based on limited user inputs.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
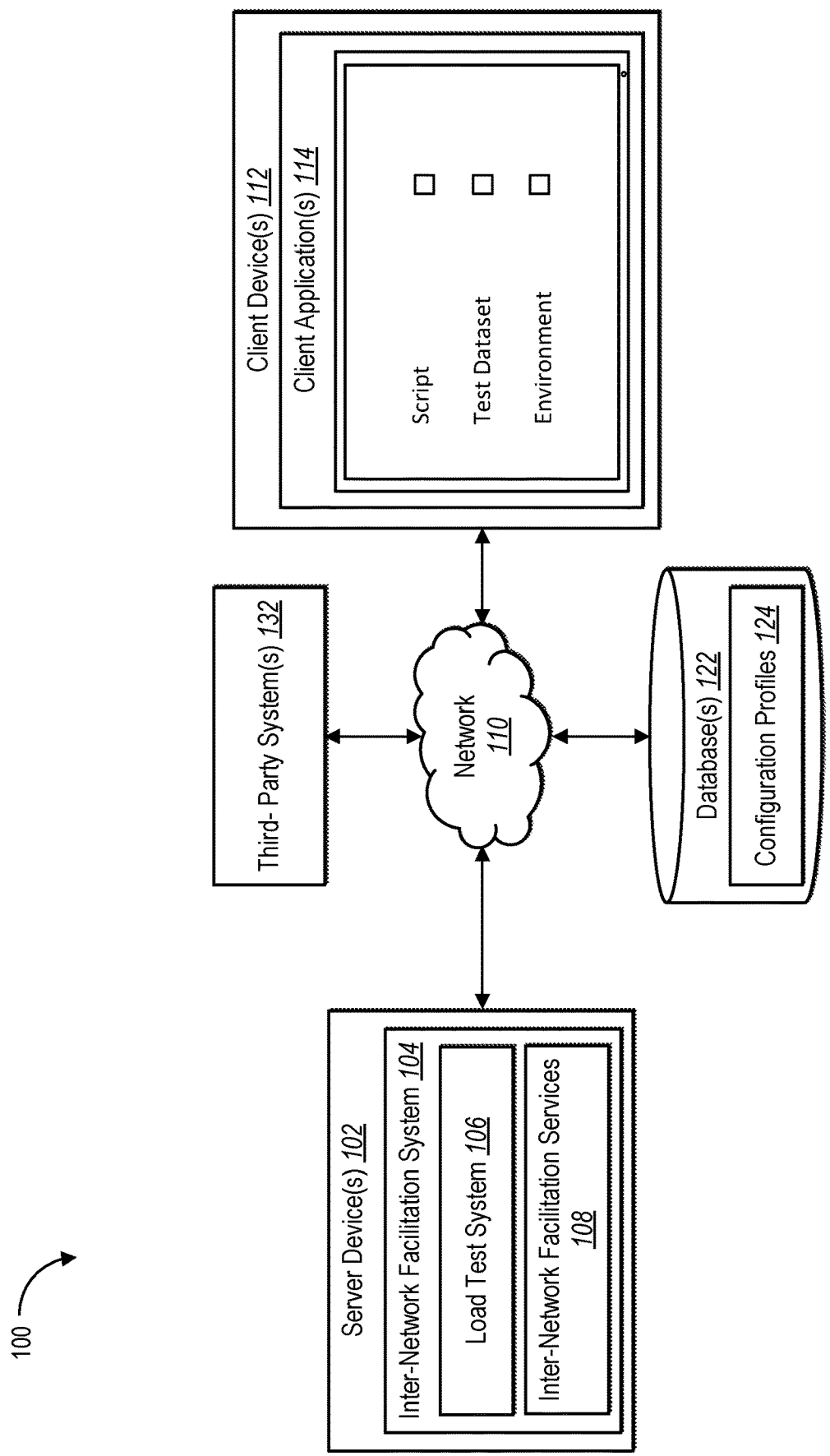
FIG. 1 illustrates a diagram of an environment in which a load test system can operate in accordance with one or more embodiments.

This disclosure describes one or more embodiments of a load test system that provides a user-friendly graphical user interface to input simple load test metrics that the system uses to automatically determine computing-resource metrics and simulate system performance under various conditions and environments. The load test system can seamlessly hide many complexities of a load test from the user and provide more flexibility in performance modeling in comparison to conventional performance modeling systems. The load test system can provide smarter workload monitoring than the state-of-the-art through the integration of production traffic and usage patterns. The load test system can further provide dynamic load testing by adjusting load values up and/or down over set time periods (e.g., step up and/or step down). Indeed, the load test system can model performance in multiple environments (e.g., development, testing, production) with the same limited user inputs.

As just mentioned, in one or more embodiments, the load test system generates a load test after determining relevant parameters from limited user inputs. In particular, in some embodiments, the load test system receives data metrics (e.g., load test script, test dataset, target throughput metric, load metric, test environment) having one or more values (e.g., options). In certain embodiments, the load test system generates a load test based on one or more of the provided data metrics. For example, the load test system may determine corresponding computing-resource metrics corresponding to the target throughput metric and load test metric. The load test system may then perform the load test by executing the load test script for the test dataset. The load test system may provide the results of the load test for display on the graphical user interface. The load test results may include metrics indicating that degree to which a target computing system passes the load test.

To provide an illustration, in one or more embodiments, the load test systems receives, from a client device, data metrics for executing a load test including multiple target throughput metrics, multiple load test metrics, and a specified duration associated with each target throughput metric and load test metric. Using these metrics, the load test system may perform the load test simulating multiple performance conditions and change the metrics for throughput and/or load for specified durations. In particular, by changing these metrics, the system can perform tests that adjust the target throughput or target load values up or down for an unlimited number of values.

To provide another illustration, in some embodiments, the load test system provides, for display within the graphical user interface of a client device, one or more selectable options for selecting a test environment for the load test. In particular, the system my define, independent of each load test script, a selection of one or more test environments (e.g., development, testing, production) for the load test use when simulating performance modeling.

In some implementations, the load test system may model known or expected production traffic and usage patterns. For example, the load test system may obtain peak production traffic and usage patterns and provide performance modeling based on the peak production traffic and usage patterns. Additionally, the load test system may model other known or expected traffic data patterns and provide insight into system performance under these conditions, discover system bottlenecks, or design a cost-effective infrastructure. To illustrate, the load test system may model known or expected traffic patterns simulating user response to a Black Friday email marketing campaign. Indeed, the load test system may also provide options to re-run load tests under changing conditions by selecting different production traffic and usage patterns.

Additionally, as mentioned above, in one or more embodiments, the load test system can automatically determine computing-resource metrics and simulate system performance under various conditions and environments. Indeed, the load test system can automatically determine computing resource metrics based on user defined and/or system determined characteristics (e.g., anticipated response times, requests per second, environment, desired throughput, modeled load, etc.). In particular, the load test system can automatically determine computing-resource metrics, such as the number of agents required for the load test, the number of threads to use for the load test, the number of cores to assign to the load test, and the amount of memory to allocate to the load test. Indeed, the system can also determine the number of leader worker agents and server worker agents to assign to each load test. And, by using multiple leader worker agents and server worker agents, the system can perform load tests with different (or the same) computing-resource metrics simultaneously or in parallel.

Further, in some cases, the load test system can generate, provide, and/or report the degree to which a target computing system passes or fails the load test. For example, the load test system can generate, provide, and/or report various statistics generated by the load test, such as start time, end time, execution time, the application performance index, request summary, number of executions, thread usage, pass statistics, fail statistics, error percentage, response times (average, min, max, median, percentile), throughput values, response times over time, active threads, latencies, connection time, etc. Additionally, the load test system can maintain historical data for load tests and provide statistics based on average performance values over time that can include the statistics for the values mentioned earlier as well as average latency, elapsed time, errors, etc. It will be appreciated by one with ordinary skill in the art that these statistics are non-exclusive and can include other statistics generated by the load test.

The load test system provides several advantages and benefits over conventional systems and methods. For instance, the load test system operates more efficiently than load test system conventional performance modeling systems through consolidated or improved graphical user interfaces. For example, by providing a consolidated graphical user interface that facilitates limiting the information required from the user to only the required data for an intelligent load test with filled-in metrics, the load test system reduces the number of user interactions required to generate such intelligent load tests. As noted above, in some cases, conventional systems require client devices to tediously navigate through isolated and different series of graphical user interfaces to enter detailed information for different load tests (e.g., threads, cores, or memory). By contrast, the load test system utilizes a consolidated graphical user interface that can intelligently capture information and increase the efficiency of the user's selection process and improve system turn-around time. Accordingly, the load test system can utilize the same received user metrics to process multiple load tests, thereby avoiding repetitive user interactions, such as entering similar information for separate applications under conventional systems. Indeed, by requiring only a limited amount of required data, the load test system reduces the burden on implementing devices resulting in shorter interaction times and reduced computational burdens on the implementing devices.

Further, the load test system improves system functionality by providing a new computational model that can efficiently and intelligently perform a load test based on limited user inputs. Unlike conventional performance modeling systems, the disclosed load test system can automatically determine computing-resource metrics in real time, such as the number of threads, number of cores, or the amount of memory. Indeed, the load test system can identify relationships between the available performance metrics and the modeled system environment to automatically allocate the appropriate computer resources to allocate for the load test. By integrating multiple applications and tools to determine input metrics for performance monitoring, the load test system can eliminate cumbersome and navigation-heavy steps and provide more realistic load test modeling algorithms.

Indeed, in some embodiments, the load test system provides an ordered combination of actions that automates the load test. In particular, in some cases, the load test system introduces an unconventional approach to generate load tests from limited metrics. For instance, in some embodiments, the load test system utilizes an unconventional ordered combination of actions to extract insights from input data, generate computing-resource metrics from the input data, and perform the load test by executing the load test script for the test dataset based on the target throughput metric, the load metric, and the computing-resource metrics. In other words, the load test system introduces a process for generating a load test from limited input data that is not utilized by conventional systems. By utilizing an unconventional process to determine the number of threads, cores, and memory required to run the load test, the load test system generates real-time load test values that could not practically be determined by humans.

As illustrated by the foregoing discussion, the present disclosure utilizes a variety of terms to describe features and benefits of the load test system. Additional detail is now provided regarding the meaning of these terms.

As used herein, the term "load test" refers to a computer performance modeling test that simulates performance of a target computing system. In particular, a load test can include a test that simulates computer performance when multiple users, processes, or programs access the computer system concurrently. As an example, a load test can model system performance based on a load test script, load test environment, target throughput metric, load metric, thread count, number of cores, amount of memory, and other computing-resource metrics. As an example, a load test can include testing a mail server or content server with thousands of concurrent users based on a specified usage pattern.

As used herein, the term "load test script" refers to a program or sequence of instructions for the load test and can be executed by the load test system. In particular, a load test script can provide the load test system with specific parameters and instructions (e.g., traffic patterns, user input patterns) that are used to model usage patterns during the load test. As an example, a load test script can identify a quantity of users and a system usage pattern to simulate the anticipated user interaction and system load caused by a new marketing campaign.

As used herein, the term "test dataset" or "load test dataset" refers to a dataset of sample values used during a load test to simulate user input in various situations. As an example, the test dataset can correspond to data that simulated users would enter into form fields on a page when signing up for a service.

As used herein, the term "target throughput metric" refers to the target amount of quantifiable computations, data exchanges, downloads, responses, uploads, transactions, or other actions that load test system will simulate for a given time period. In particular, the target throughput can be the desired number of transactions produced over time during the relevant segment of the load test. As an example, a target throughput metric could be a target of 30 transactions per second for a 5-minute interval.

As used herein, the term "load metric" refers to a measure of the amount of computational processes that the system is utilizing at a given time. In particular, the load metric can be measured as the percentage of the maximum amount of processes that the system can utilize that are being utilized at a given time. As an example, a load metric of 80% refers to a system load of 80% of the maximum load the system is designed to support.

As further used herein, the term "inter-network facilitation system" refers to a system that, via the load test system, facilitates digital communications across different computing systems over one or more networks. For example, an inter-network facilitation system manages load test information, such as load test scripts, load test script data, load test agents, load test status, and load test results for a load test within the inter-network facilitation system. In some cases, the inter-network facilitation system is a centralized network system that includes multiple network components for facilitating access to load tests via a central network location. Indeed, the inter-network facilitation system can link load tests within the inter-network facilitation system to provide information regarding, and management tools for, the different load tests.

As used herein, the term "computing-resource metric" refers to a value for a computer system resource. In particular, the computing-resource metric can refer to a metric qualifying computing hardware, connectivity, or processing required by a target computing system for a load test or a target computing action or series of target computing actions. For example, a computing-resource metric can be system memory, cache memory, hard disk space, network connections, processes, or file storage. For example, the computing-resource metric can be a value for the number of threads, number of cores, or amount of memory that is allocated to a load test.

As used herein, the term "duration" refers to a measure of time. In particular, the term duration can be a measure of time that the load test system models specific load test parameters during the load test before changing and modeling other load test parameters.

As used herein, the term "segment" refers to a portion of the load test. In particular, the term segment refers to a portion of the load test that could be executed sequentially with another portion. As an example, a segment could be a portion of the load test where the load test system models a throughput of 5 and a load of 80%.

As used herein, the term "test environment" refers to a computing software and/or hardware environment. In particular, the test environment is the computer systems, programs, processes, and hardware that is allocated to a specific environment. As an example, a test environment could be the computer systems, programs, processes, and hardware that is allocated for use in a development, test, or production environment.

As used herein, the term "traffic data pattern" refers to a pattern in data traffic over time. In particular, a traffic data pattern represents the pattern of the system traffic over the whole or part of the network and can be acquired by monitoring the system over time. As an example, a traffic data pattern could be a model of the pattern of traffic between an email server and an email client during a marketing rollout.

As used herein, the term "thread" refers to a sequence of programmed instructions that can be independently managed. In particular, a thread can be a component of a process and can form a smallest sequence of programmed instructions managed by an operating system or component of an operating system (e.g., scheduler). As an example, multiple threads may be executed concurrently, sharing resources such as network connections, system memory, and filesystems.

As used herein, the term "leader worker agent" refers to a system process that controls and manages other system processes. In particular, a leader worker agent can be a script that manages other processes (e.g., server worker agents), downloads files, executes programs, or sends reports. Relatedly, the term "server worker agent" refers to a system process designed to be controlled and managed by other system processes. In particular, a server worker agent can be a script that is managed by other processes or agents (e.g., leader worker agents), downloads files, executes programs, or sends reports. As an example, a leader worker agent may run in an infinite loop and manage multiple server worker agents to execute load tests.

Additional detail will now be provided in relation to illustrative figures portraying example embodiments and implementations of the load test system. For example, FIG. 1 illustrates a block diagram of an example embodiment of a system 100 for implementing a load test system 106 in accordance with one or more embodiments. In general, and as illustrated in FIG. 1, the environment includes server device(s) 102 housing the load test system 106 and the inter-network facilitation services 108 as part of an inter-network facilitation system 104. The environment of FIG. 1 further includes client device(s) 112, third-party system(s) 132, and database(s) 122. The server device(s) 102 communicate with the client device(s) 112, database(s) 122, and third-party system(s) 132 over a network 110. Further, the client device(s) 112 may also communicate with the database(s) 122 and the third-party system(s) 132 via the network 110.

As will be described in greater detail below, the server device(s) 102 can perform or provide various function, features, processes, methods, and systems as described herein. Additionally, or alternatively, the client device(s) 112 can perform or provide the various functions, features, processes, methods, and systems as described herein. In one or more embodiments, the server device(s) 102 and the client device(s) 112 coordinate together to perform or provide the various functions, features, processes, methods, and systems, as described in more detail below.

Generally, the client device(s) 112 can include any one of various types of client devices. For example, the client device(s) 112 can be a mobile device (e.g., a smart phone), tablet, laptop computer, desktop computer, or any other type of computing device as further explained below with reference to FIG. 7. Additionally, the client application(s) 114 can include any one of various types of client applications. For example, one or more of the client application(s) 114 can be a web browser, and users at the client device(s) 112 may enter a Uniform Resource Locator (URL) or other address directing the web browser to access the inter-network facilitation system 104 and/or load test system 106 on the server device(s) 102. Alternatively, the client application can be a native application installed and executed on the client device(s) 112.

Additionally, the server device(s) 102 can include one or more computing devices including those explained below with reference to FIG. 7. The client device(s) 112, the server device(s) 102, and the network 110 may communicate using any communication platforms and technologies suitable for transporting data and/or communication signals, including any known communication technologies, devices, media, and protocols supportive of data communications, examples of which are described with reference to FIG. 8.

Generally, the database(s) 122 can include any one of various types of databases. For example, the database(s) 122 can include one or more of test databases, relational databases, or other databases.

Although not a requirement, in one or more embodiments, the load test system 106 can be part of the inter-network facilitation system 104. Accordingly, as shown in FIG. 1, the server device(s) 102 hosts the inter-network facilitation system 104, which includes the load test system 106 and the inter-network facilitation services 108. The server device(s) 102 can optionally include one or more computing devices (or the database 124) to implement the load test system 106. In one or more embodiments, the inter-network facilitation system 104 collects various types of data, including from the third-party system(s) 132 and provides data to the load test system 106. Further, in some embodiments, the load test system 106 receives and utilizes metrics—including a load test script, load test dataset, load test environment, and/or other data—for executing load tests from the client device(s) 112. In other embodiments, the server device(s) 102 can include a system other than the load test system 106 for collecting, generating, accessing, or otherwise managing data. Additionally, the server device(s) 102 can receive data via the network 110 from the client device(s) 102, the third-party system(s) 132, or from another source.

The third-party system(s) 132 can correspond to a variety of systems that provide a variety of data for load tests corresponding to the load test system 106. To illustrate, the third-party system(s) 132 can include systems that provide or maintain authentication data, load test script data, load test results, and a variety of other load test system data. In one or more embodiments, the third-party system(s) 132 provide data to the server device(s) 102 and the load test system 106 via the network 110.

Although FIG. 1 illustrates the environment having a particular number and arrangement of components associated with load test system 106, in some embodiments, the environment may include more or fewer components with varying configurations. For example, in some embodiments, the inter-network facilitation system 104 or load test system 106 can communicate directly with the client device(s) 112, the third-party system(s) 132, and/or the database(s) 122, bypassing the network 110. In these or other embodiments, the inter-network facilitation system 104 or the load test system 106 can be housed (entirely or in part) on the client device(s) 112. Additionally, the inter-network facilitation system 104 or the load test system 106 can include (e.g., house) the database(s) 122. Further, the inter-network facilitation system 104 can include more network components communicatively coupled together.

Figure 2:
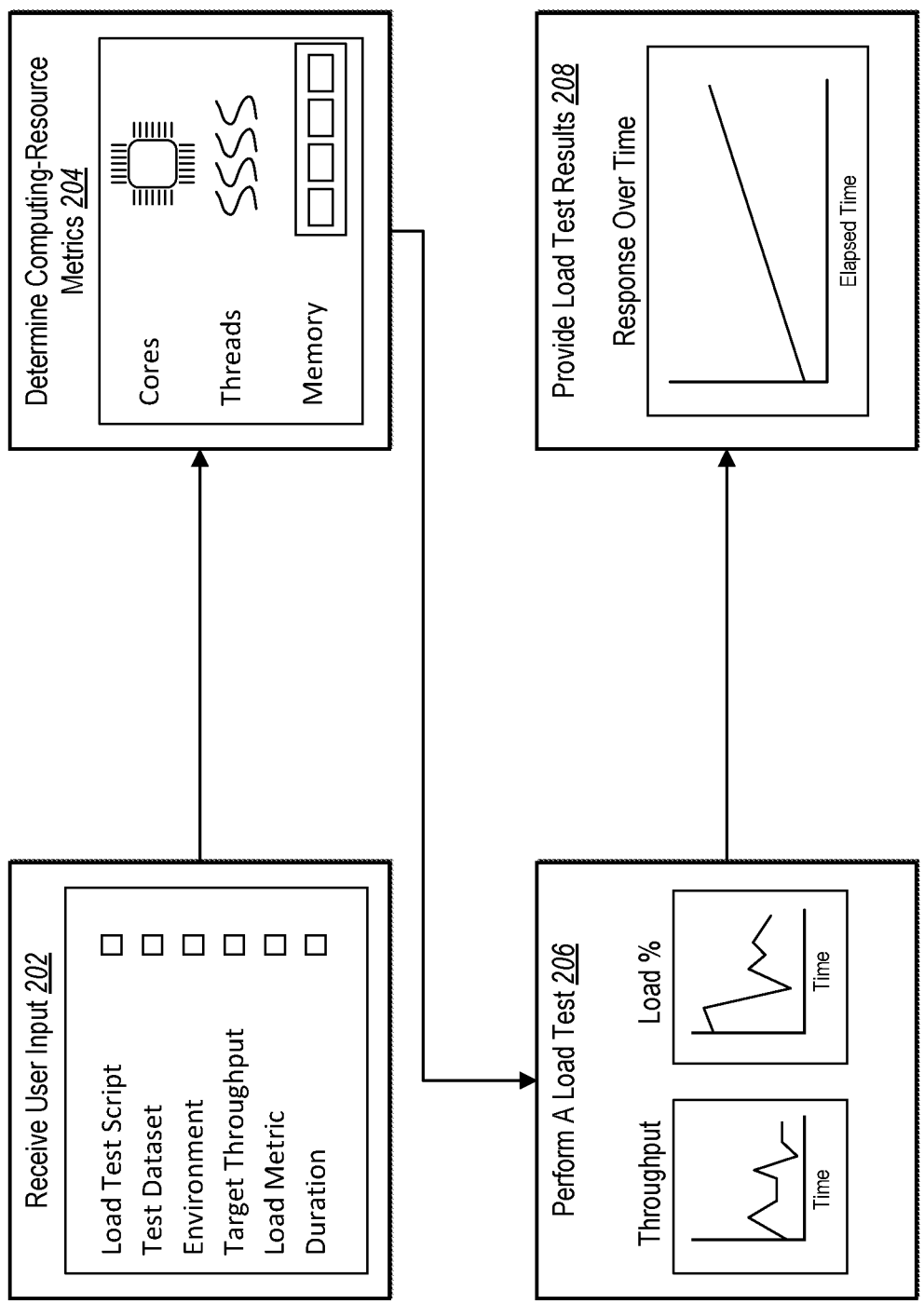
FIG. 2 illustrates an overview of the load test system performing a load test for a target computing system based on limited input metrics in accordance with one or more embodiments.

As indicated above, the inter-network facilitation system 104 or the load test system 106 can provide (and/or cause the client device(s) 112 to display or render) visual elements within a graphical user interface associated with the client application(s) 114. Indeed, in one or more embodiments, the load test system 106 can generate load tests and determine computing-resource metrics from limited user input received via input through the graphical user interface of one or more of the client application(s) 114. More specifically, FIG. 2 illustrates an example overview of receiving user input via and graphical user interface and generating a load test in accordance with one or more embodiments. Additional detail regarding the various acts illustrated in FIG. 2 is provided thereafter with reference to subsequent figures.

As illustrated in FIG. 2, the load test system 106 may perform an act 202 to receive user input. For example, in one or more embodiments, the act 202 includes receiving the limited user inputs of a load test script, load test dataset, load test environment, target throughput metrics, load test duration, and/or target load metric. As further illustrated in FIG. 2, the load test system 106 performs an act 204 to determine computing-resource metrics for the load test. More specifically, in some embodiments, the load test system 106 uses the user input received in act 202 to determine a number of cores, number of threads, and amount of memory required for the facilitating the load test (among other computing-resource metrics). For example, the load test system 106 may determine a number of threads, a number of cores, and an amount of memory to allocate to the load test based on evaluating the load test system 106 parameters and the user inputs received in act 202.

As further shown in FIG. 2, the load test system 106 performs an act 206 of performing a load test using the computing-resource metrics (e.g., cores, threads, member, etc.) determined in act 204 and user input values (e.g., throughput, load, etc.) provided in act 202. Furthermore, the load test system 106 may perform the load test using dynamic values for computing-resource metrics. Specifically, the load test system 106 may use one set of computing-resource metrics when initiating the load test and different values for computing-resource metrics as the load test continues to execute. As an example, the load test system 106 may monitor the status of the load test in real time and dynamically change the computing-resource metrics and resources allocated to the load test during the load test execution. To further illustrate, the load test system 106 may initially allocate 100 threads to the load test but determine that the initial allocation of threads for the load test was insufficient (e.g., to meet the desired metrics for throughput and load) and consequently allocate an additional 50 threads to be used for the load test. As another illustration, the load test system 106 may run a load test with a target throughput of 100 with a target load of 50% for 30 seconds, 100% for 15 seconds, 20% for 5 seconds, and 80% for 2 minutes. Indeed, the load test system 106 may allocate different computing-resource metrics and resources to the load test system 106 to model the different target load requirements for the load test.

The load test system 106 may further perform an act 208 to provide load test results. For example, the load test system 106 can provide various statistics generated by the load test, such as start time, end time, execution time, the application performance index, request summary, number of executions, thread usage, pass statistics, fail statistics, error percentage, response times (average, min, max, median, percentile), throughput values, response times over time, active threads, latencies, connection time, and other statistics to the system. The load test system 106 can provide these load test results to the server device(s) 102, the client device(s) 112, the database(s) 122, or the third-party system(s) 132.

In one or more embodiments, the load test system 106 can repeat the acts illustrated in FIG. 2. For example, the load test system 106 can repeat the acts 202-208 to model multiple load patterns and user input values. To illustrate, the load test system 106 can run multiple load tests changing the test environment input value but using the same input values for the load test script, test dataset, target throughput, load metric, and duration values. The load test system 106 can also repeat only some of the acts portrayed in FIG. 2, such as the acts 204-206, to model changing computing-resource metrics. To illustrate, the load test system 106 may first run a load test with a target throughput of 100 with a target load of 50% using 120 threads and determine an average response time of 7.88. The load test system 106 may then adjust the thread count to 140 threads to determine a new average response time with a different value.

Figure 3:
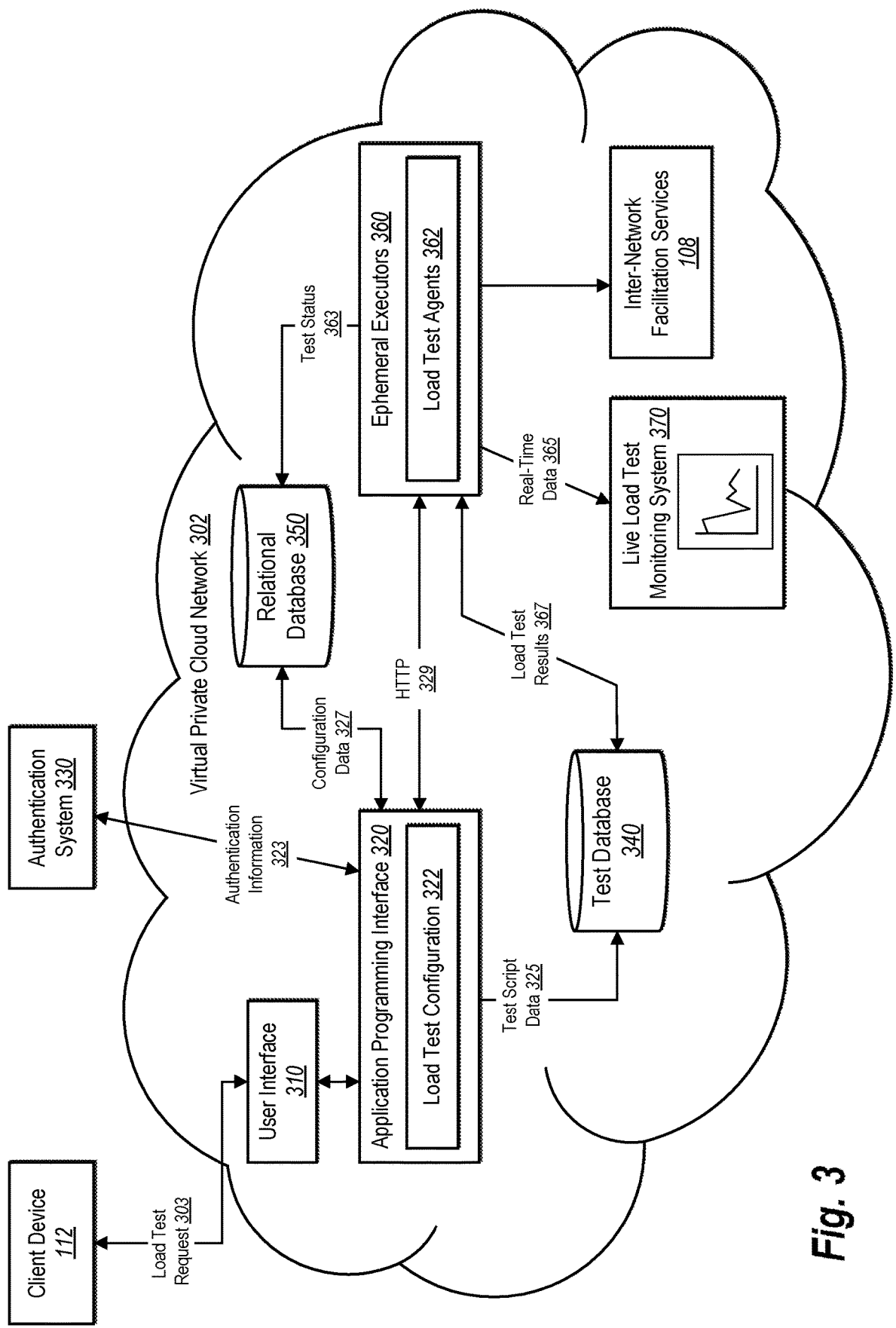
FIG. 3 illustrates a system architecture of the load test system in accordance with one or more embodiments.

As previously mentioned, the load test system 106 can generate a load test after determining relevant parameters from limited user inputs. As noted below, in accordance with one or more embodiments, FIG. 3 illustrates an example architecture and data flow of the load test system 106. In particular, as shown in FIG. 3, the load test system 106 utilizes an application programming interface 320 to interact with ephemeral executors 360 and perform a load test to provide real-time data 365 to a live load test monitoring system 370.

More specifically, as illustrated in FIG. 3, the load test system 106 detects a load test request 303 from client device(s) 112 entered via a user interface 310. As shown, the load test system 106 utilizes and application programming interface 320 that employs a load test configuration 322. If the client device(s) 112 are located outside a virtual private cloud network 302 (as shown in FIG. 3), then the application programming interface 320 performs the act 330 to send authentication information 323 to the authentication system with a request to determine if the client device is authorized to perform the load test (or alternatively the application programming interface 320 performs the authentication). The authentication system can provide authentication information 323 to the application programming interface 320 either confirming or denying permission submit the load test request 303 to access the load test system 106 and submit the load test request 303.

As further illustrated in FIG. 3, the load test system 106 may utilize an application programming interface 320 to communicate with the user interface 310, test database 340, relational database 350, and ephemeral executors 360. The application programming interface 320 can receive the user input (e.g., the load test request 303). For instance, the application programming interface may provide prompts via a graphical user interface, such as one or more graphical user interfaces shown in FIGS. 5A-5D, to receive user input. The application programming interface 320 may (i) send test script data 325 to be stored in the test database 340, (ii) send configuration data 327 to be stored in a relational database 350, and/or (iii) communicate with the ephemeral executors 360 using applicable protocols as represented by http 329.

As one example of the functionality of the application programming interface 320, in one implementation of the load test system 106, the application programming interface 320 may receive a load test request 303 from a client device(s) 112 to begin a load test. The application programming interface 320 may then determine the load test configuration 322 and provide test script data 325 to the test database 340 and configuration data 327 to the relational database 350. The application programming interface 320 may then communicate with the ephemeral executors 360 to allocate system resources to a load test.

As further illustrated in FIG. 3, in some embodiments, the ephemeral executors 360 receive an indication to allocate system resources to a load test from the application programming interface 320. Specifically, in certain cases, the ephemeral executors 360 perform the act 204 to determine the computing-resource metrics to allocate to the load test. The ephemeral executors 360 can allocate load test agents 362 to execute the load test. For example, the ephemeral executors 360 can allocate a number of leader worker agents and server worker agents to run the load test. Specifically, in one embodiment, the ephemeral executor 360 may allocate one leader worker agent and 4 server worker agents to run the load test.

Additionally, the ephemeral executors 360 can communicate with the relational database 350 and provide the test status 363 of the load test to the relational database 350. The ephemeral executors 360 can also provide real-time data 365 to the live load test monitoring system 370. Specifically, in some cases, the ephemeral executors 360 provide real-time reporting data to the live load test monitoring system 370 (as shown in FIGS. 5E-5D) during the execution of the load test. The ephemeral executors 360 can also communicate with inter-network facilitation services 108 to coordinate with other system processes in the virtual private cloud network 302. The ephemeral executors 360 can also provide load test results 367 to the test database 340.

Consistent with the disclosure above, in some embodiments, the client device(s) 112 transmit (and the server device(s) 102 receive) a load test request 303 indicating a request to perform a load test. For example, in some embodiments, the client device(s) 112 can detect user input requesting generation of a load test including specific metrics via a variety of graphical user interfaces. For example, the client device(s) 112 may detect a selection of an option to generate a load test via a graphical user interface through which the client device(s) 112 receives information about a potential load test or provides load test metrics for a load test.

As mentioned above and shown in FIGS. 4A-4B, in certain described embodiments, the load test system 106 can utilize various system elements to perform a load test. Indeed, FIGS. 4A-4B illustrate the load test system 106 and possible ways to coordinate between system elements including the coordination between the application programming interface 320, the ephemeral executors 360, and the orchestration engine 402.

Figure 4A:
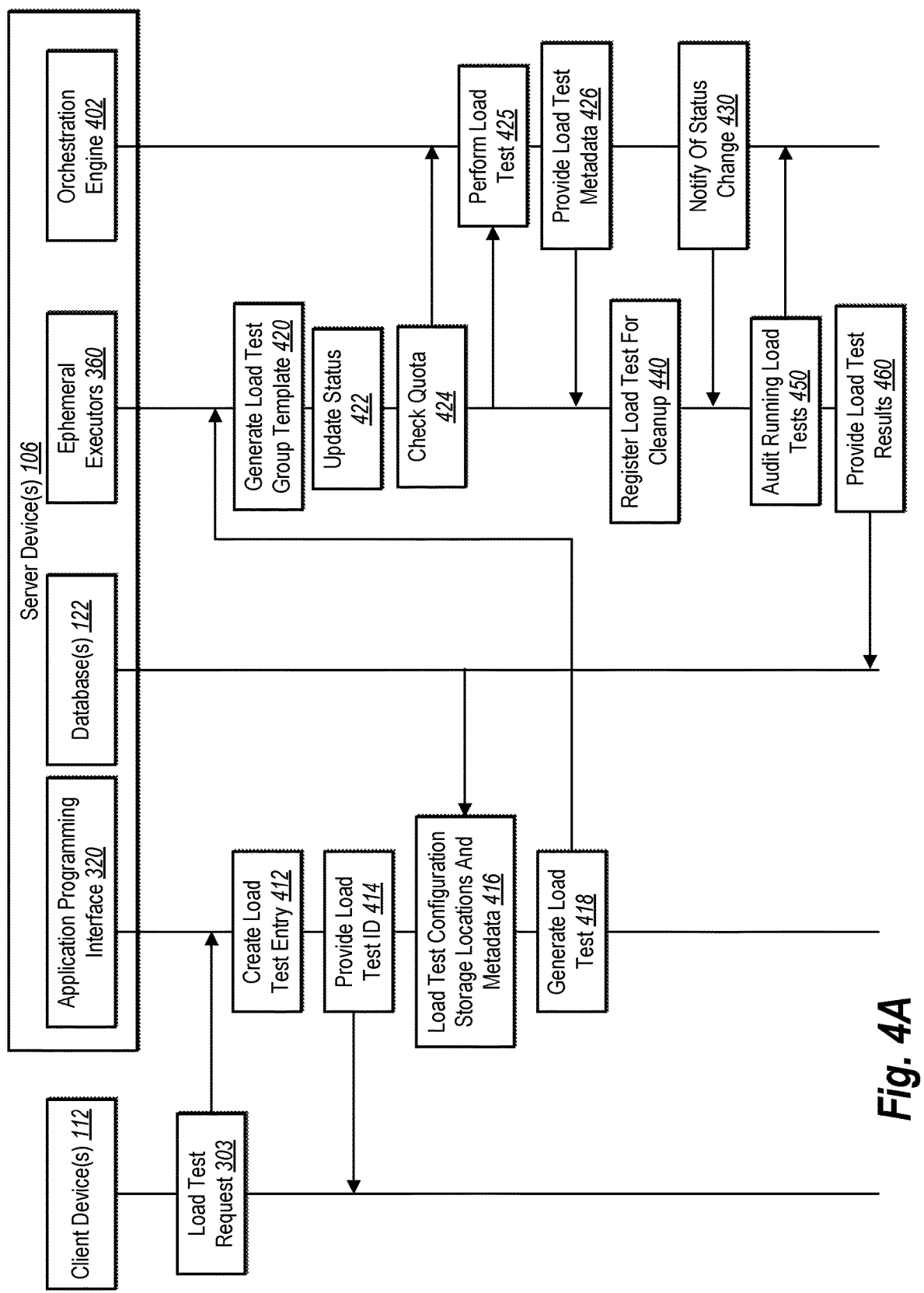
FIGS. 4A-4B illustrate an overview of different components of the load test system performing different actions to run a load test for a target computing system based on limited input metrics in accordance with one or more embodiments.
Figure 4B:
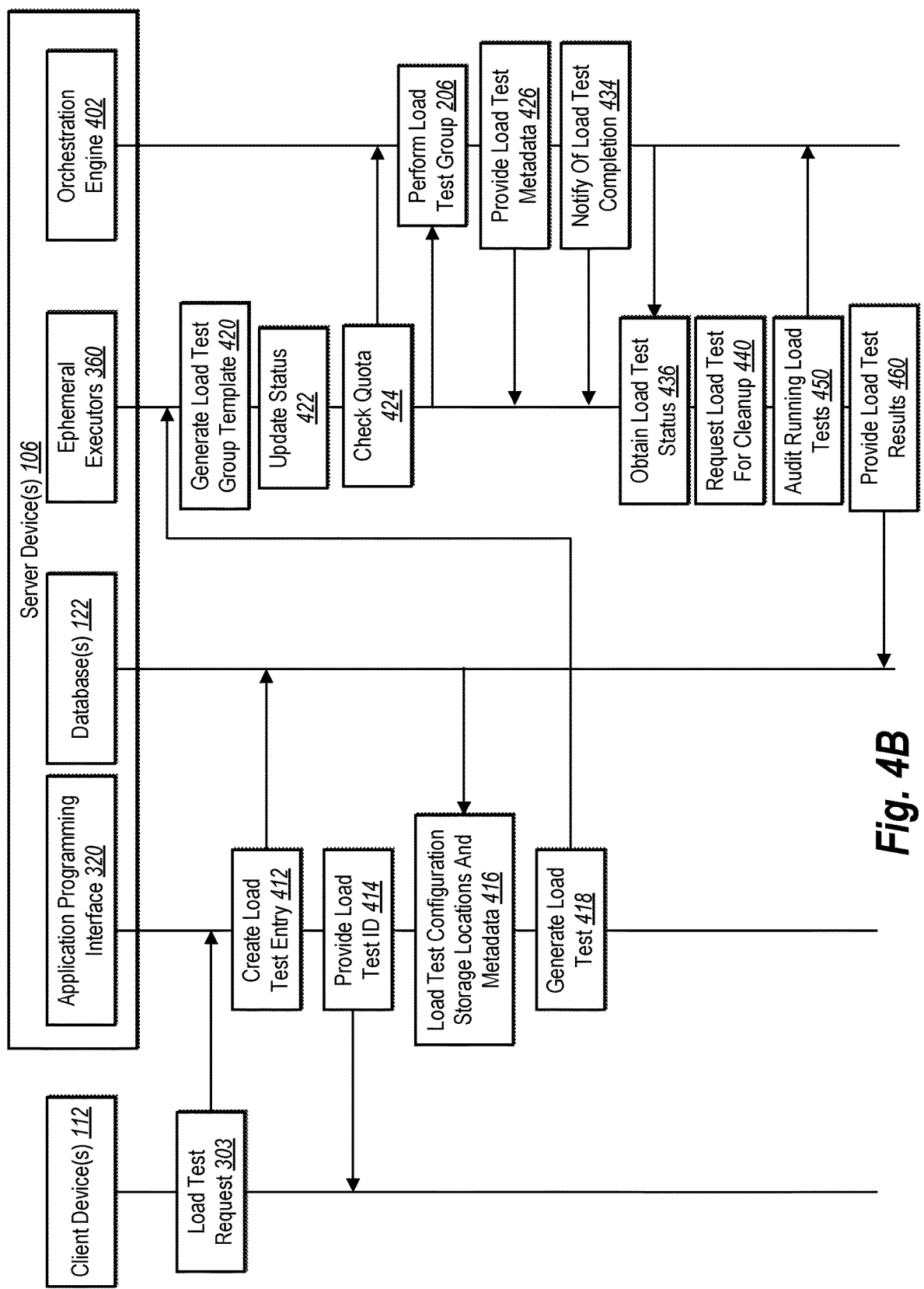

As indicated in FIG. 4A, the client device(s) 112 transmit the request to generate the load test via a load test request 303 to the server device(s) and the application programming interface 320. FIG. 4A further illustrates the application programming interface 320 performing the act 412 and creating a load test entry in database(s) 122. In one or more embodiments, the application programming interface 320 may create a load test entry and save test script data 325 in the test database 340. As further shown in FIG. 4A, in some embodiments, the application programming interface 320 performs the act 414 of transmitting to the client device(s) 112 the load test ID. The client device(s) 112 may use the load test ID to identify and track the requested load test. Furthermore, the application programming interface 320 performs the act 416 of receiving load test configuration storage locations and metadata from the database(s) 122.

Additionally, the application programming interface 320 performs the act 418 of generating the load test. For example, the application programming interface 320 performs the act 418 of generating the load test by performing the act 204 to determine the computing-resource metrics and sending a request to the ephemeral executors 360. In response, the ephemeral executors 360 performs the act 420 to generate a load test group template. As an illustration, the application programming interface 320 may perform the act 204 to determine the computing-resource metrics including the number of cores, number of threads, and/or amount of memory to allocate to the load test. The application programming interface 320 may provide the computing-resource metrics and other load test configuration values (e.g., authentication information, load test ID, storage locations, metadata) to the ephemeral executors 360.

Based on or in response to receiving this communication, the ephemeral executors 360 may assign leader worker agents and server worker agents to execute the load test. The agents (both leader worker agents and server worker agents) may obtain configuration, data file locations, download data files, download test scenarios, prepare files for test execution, verify that the load test system 106 is responding, and provide readiness confirmation to the ephemeral executors 360. Additionally, in one or more embodiments, the agents perform the act 422 to update the database(s) 122 with the current load test status after performing any of the above actions (including, but not limited to, acts 420, 424, 206, 426, 440, 430, 434, 436, 440, 450, and 460). In this way, the client device(s) 112 may learn the status of the load test in real time by querying the database(s) 122.

As further illustrated in FIG. 4A, the ephemeral executors 360 perform the act 424 to check the quota with a request to the orchestration engine 402. For example, the ephemeral executors 360 may query the leader worker agents to determine if there are system resources available to run the load test. If the leader worker agents determine there are sufficient resources to run the load test, the leader worker agents may then assign a leader worker agent and multiple server worker agents to run the load test. Additionally, as shown in FIG. 4A, the orchestration engine 402 performs the act 425 of performing the load test with the assigned agents and computer-resource metrics (e.g., by performing act 206). To illustrate, the leader worker agent may start the load test by establishing the load test framework and allocating the system resources (e.g., cores, threads, memory) and coordinating with the assigned server worker agents. Furthermore, the leader worker agent may dynamically change the allocation of system resources and number of assigned server worker agents during the load test based on the requirements of the load test (e.g., throughput, load, response time, duration). As the load test is running, in some embodiments, the orchestration engine 402 performs the act 426 of providing load test metadata to the ephemeral executors 360. Additionally, as mentioned above, in certain implementations, the worker agents perform the act 422 to update the database(s) 122 with the current load test status after performing act 426.

As further illustrated in FIG. 4A, the ephemeral executors 360 perform the act 440 to register the load test for cleanup. As an illustration, the leader worker agents may terminate the elements of the load test framework, communicate with the server worker agents, and provide termination results to the ephemeral executors 360. The server worker agents may terminate running load test processes, communicate with the leader worker agents, and provide termination results to the ephemeral executors 360. In addition, as shown in FIG. 4A, the orchestration engine 402 performs the act 430 to notify the ephemeral executors 360 of the status change of the load test. In turn, the ephemeral executors 360 perform the act 422 to update the status of the load test in the database(s) 122.

Furthermore, as shown in FIG. 4A, the ephemeral executors 360 perform the act 450 to audit the running load tests. To illustrate, the ephemeral executors 360 perform an audit to determine if any completed load tests have been unsuccessfully terminated (for example, an unsuccessful cleanup at act 440) and if any of the framework for the load test has not been released. As one example, the ephemeral executors 360 may determine if any of the completed tests have hanging threads or processes. If the ephemeral executors 360 determine there are hanging threads, the ephemeral executors 360 may force the termination of these threads. Alternatively, in certain cases, the ephemeral executors 360 implement a process of automatically terminating load test threads at a specified time after the load test has completed. As another example, the ephemeral executors 360 determine if any test groups have been provided with excess or insufficient system resources. The ephemeral executors 360 may correct the resource allocation to properly account for the load testing requirements. As further shown in FIG. 4A, the ephemeral executors 360 perform act 460 to provide load test results to the database(s) 122. This disclosure depicts and describes such results further below.

Turning to FIG. 4B. As described above in reference to FIG. 4A, the load test system 106 may receive a load test request 303 and perform the acts 412-426. Furthermore, as shown on FIG. 4B, after performing act 426, the orchestration engine 402 perform the act 434 of notifying the ephemeral executors 360 of the load test completion. To illustrate, in this implementation, the ephemeral executors 360 start performing the load test cleanup in response to or after receiving a notification of the load test completion.

As further shown in FIG. 4B, the ephemeral executors 360 perform the act 436 of obtaining the load test status (e.g., status of framework, agents, processes, threads, cores, memory, etc.). After determining the load test status, the ephemeral executors 360 performs act 440 and request the load test cleanup, as described above in reference to FIG. 4A. Furthermore, the load test system 106 performs act 450 to audit the load test groups, as described above in reference to FIG. 4A, and load test system 106 performs act 460 to provide the load test results to the database(s) 122.

As discussed above, the load test system 106 can generate a system action based on user selections provided via a graphical user interface as part of a load test selection sequence. FIGS. 5A-5D illustrate the load test system 106 graphical user interfaces 502a-d that can be displayed via a computing device 500. More specifically, FIGS. 5A-5D illustrate navigation through the load test system 106 graphical user interfaces 502a-d to generate a load test.

Figure 5A:
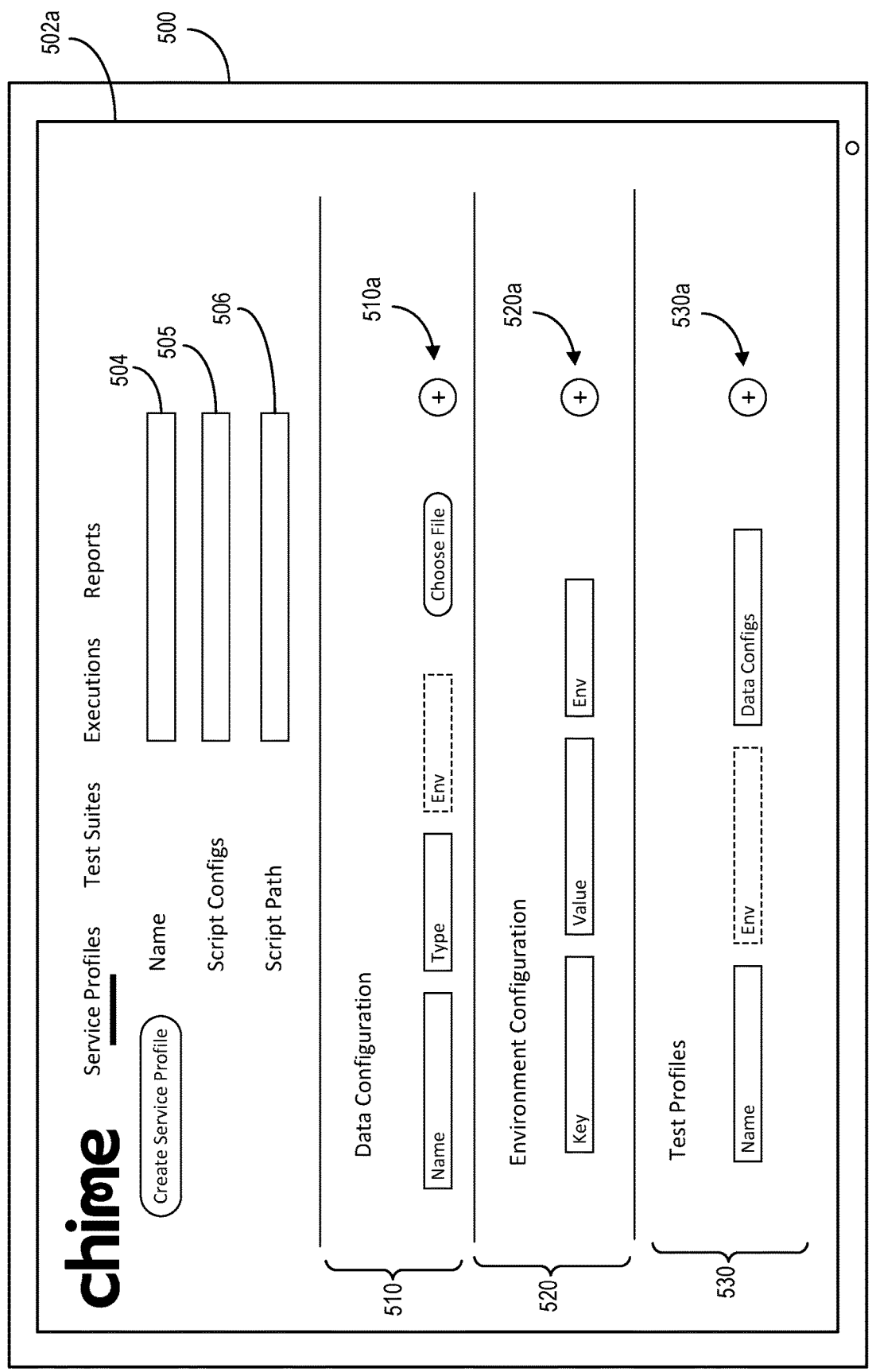
FIGS. 5A-5F illustrate example graphical user interfaces for generating load tests and viewing load test results in accordance with one or more embodiments.

As illustrated in FIG. 5A, the load test system 106 graphical user interface 502a may include fields to receive service profile input values. As shown, to create a service profile for the load test system 106, the computing device 500 can receive values for the service profile name 504, the script configuration 505, and the script path 506 via the graphical user interface 502a. The graphical user interface 502a can accept data configuration fields 510 related to the data configuration. In particular, in response to detecting user interaction with the add-on selection button 510a, the computing device 500 provides, for display within the graphical user interface 502a, one or more options (e.g., input fields) to add data configuration values to data configuration fields 510—where the data configuration values may include a name, file type, and environmental configuration. The graphical user interface 502a can accept environment configuration fields 520 related to the environment configuration. In particular, in response to detecting user interaction with the add-on selection button 520a, the computing device 500 provides, for display within the graphical user interface 502a, one or more options (e.g., input fields) to add environment configuration values to environment configuration fields 520—where the environment configuration values may include a key, value, and environmental configuration. The graphical user interface 502a can accept values 530 related to test profiles. In particular, in response to detecting user interaction with the add-on selection button 530a, the computing device 500 provides, for display within the graphical user interface 502a, one or more options to add test profile values to test profile fields 530—where the test profile values may include a name, environmental configuration, and data configuration options.

Figure 5B:
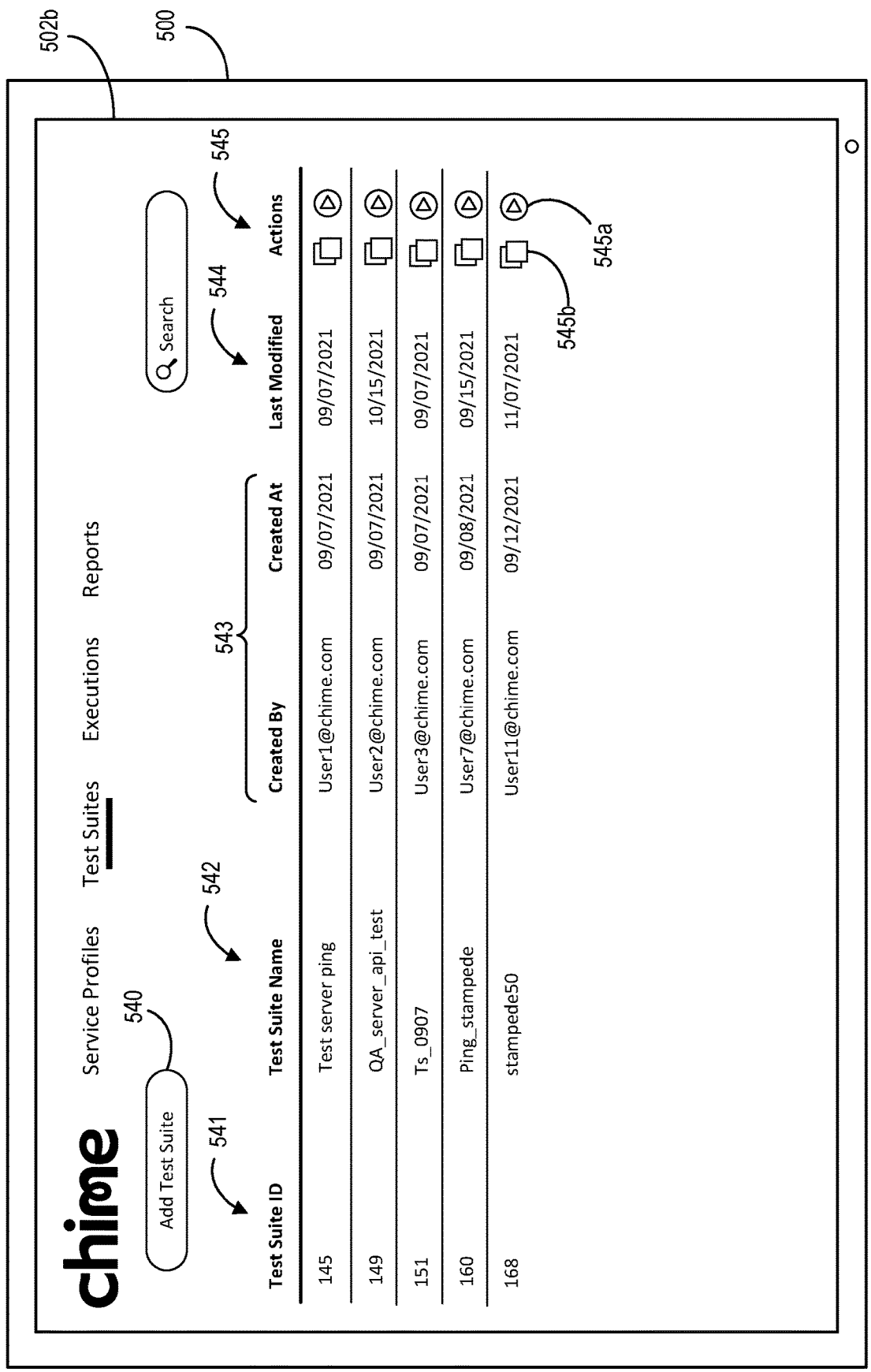

As shown in FIG. 5B, in some embodiments, the load test system 106 can create test suites that utilize the one or more of the service profiles created profiles as described above. Notably, the load test system 106 can automatically determine computing-resource metrics based on user input, system metrics, and the selected environment for the test suites.

As illustrated in FIG. 5B, the load test system 106 provides, for display in the graphical user interface 502b, test suite configuration values such as the test suite ID 541, test suite name 542, creation data 543, modification data 544, and actions 545. The load test system 106 creates and performs load tests through interaction with elements of the graphical user interface 502b. As an illustration, in response to detecting user interaction with the action button 545a for the test suite ID 168, the computing device 500 (or a corresponding server) executes the corresponding load test. Additionally, in response to detecting user interaction with the action button 545b for the test suite ID 168, the computing device 500 (or the corresponding server) duplicates (and may also run) the corresponding load test. Indeed, based on detecting a user interaction with the action button 545b, the load test system 106 can make a baseline copy of the corresponding load test that can be modified. The load test system 106 can also run the baseline copy and/or the modified load test. As mentioned above, the load test system 106 can run multiple load tests simultaneously or in parallel. Based on detecting user interactions with the action button 545a and/or 545b, the load test system 106 can quickly and easily run multiple concurrent load tests from the graphical user interface 502b. To illustrate, after detecting a user interaction with the associated action button 545a, the load test system 106 can run the load test stampede50 (test suite ID 168) simultaneously with the load test Ping_stampede (test suite ID 160).

Figure 5C:
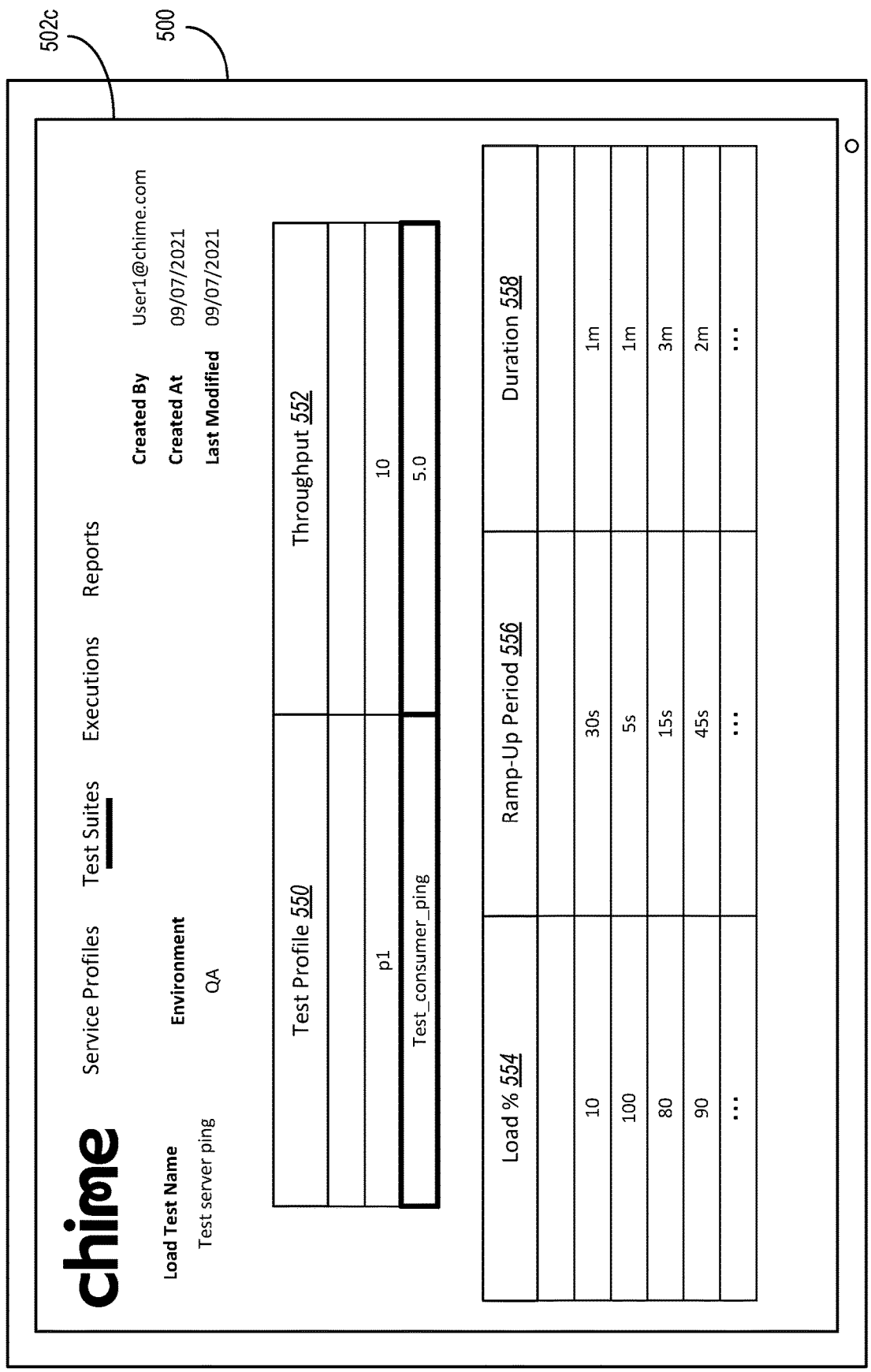
Figure 5D:
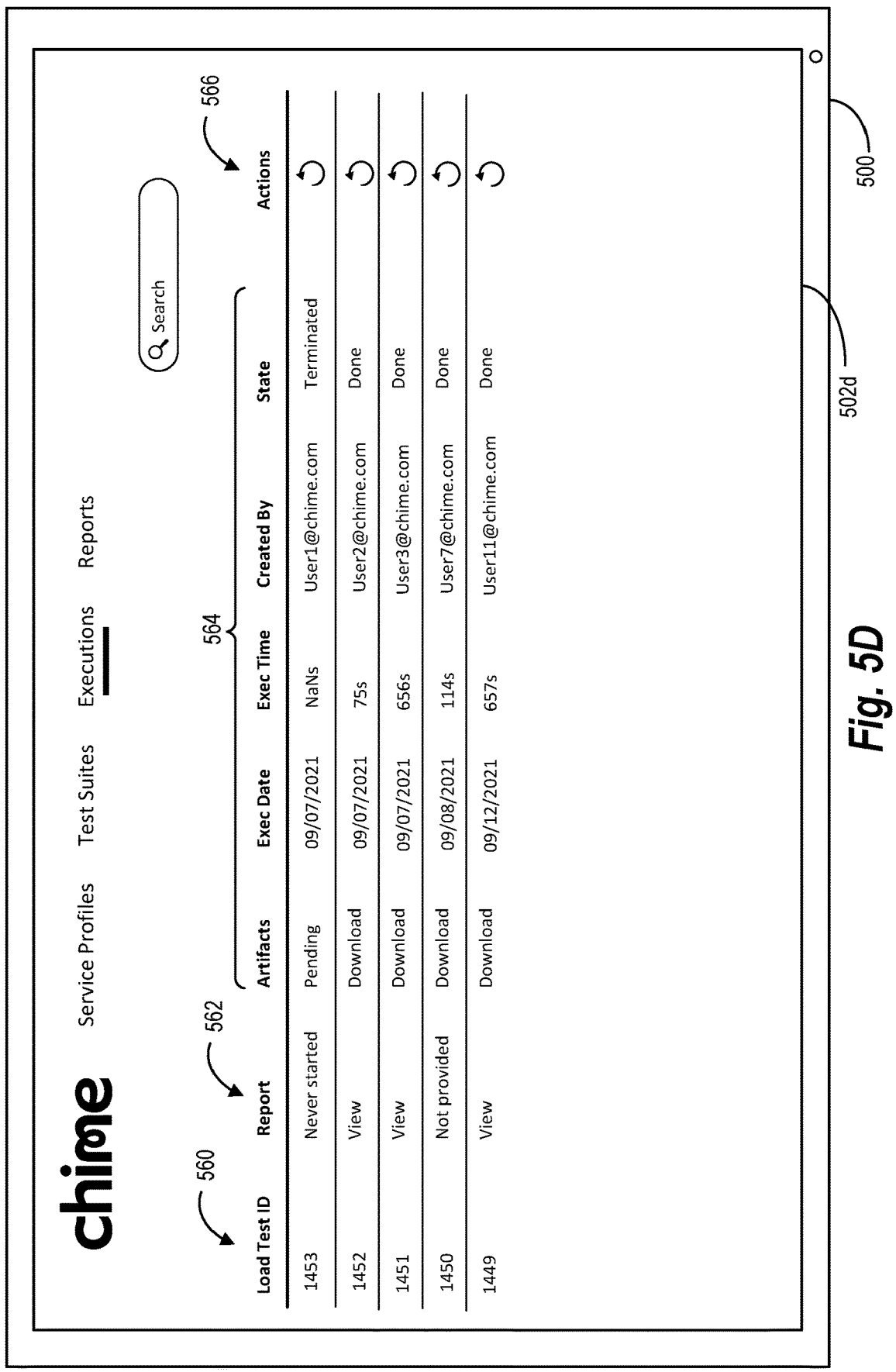
Figure 5E:
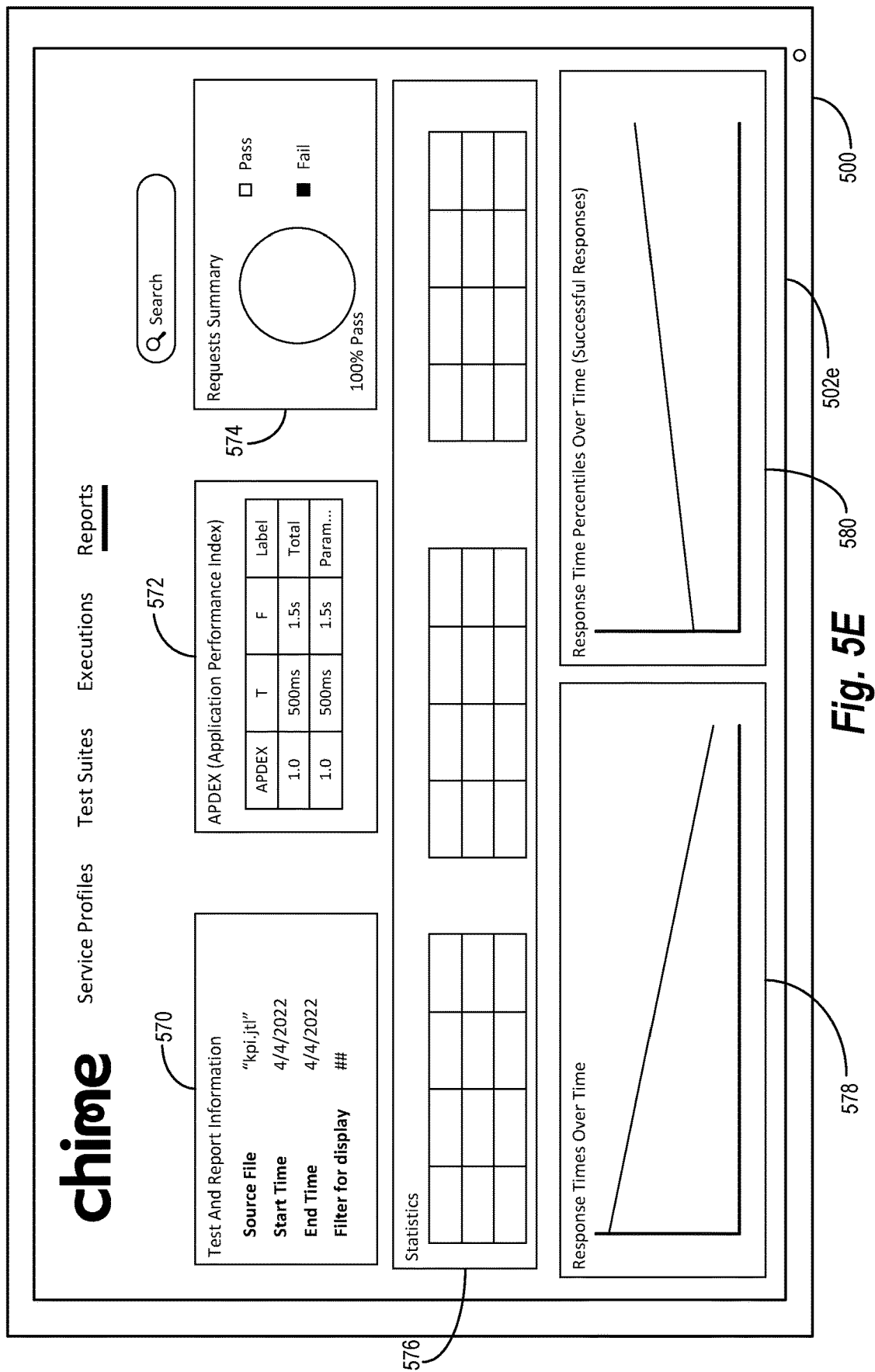

As further illustrated in FIG. 5B, the load test system 106 graphical user interface 502b includes an add test suite selection button 540. In response to detecting user interaction with the add test suite selection button 540, the computing device 500 presents a graphical user interface 502c to add a new load test as shown in FIG. 5C. For example, after creating the service profile, the load test system 106 can generate a test suite for performing the load test.

Specifically, as illustrated in FIG. 5C, the load test system 106 graphical user interface 502c may include fields for selecting conditions for performing a load test. More specifically, in one or more embodiments, the load test system 106 can run a load test based on only the user inputs of a test profile 550, desired throughput 552, load percentage metric 554, ramp up period 556, and duration 558. As another example (not shown), in another embodiment, the load test system 106 can run a load test based on only the user inputs of a test profile 550, desired throughput 552, and load percentage metric 554.

To illustrate, as shown in FIG. 5C, the load test system 106 performs a load test based on the user input of "Test_consumer_ping" for the test profile 550 and a user input of "5.0" for the desired throughput 552. Furthermore, as shown in FIG. 5C, the load test system 106 performs the load test with multiple segments using the specified testing values for the "Test_consumer_ping" test profile 550 such as 10% load with a ramp-up period of 30 s and duration of 1 m, then 100% load for a ramp-up period of 5 s and a duration of 1 m, 80% load with a ramp-up period of 15 s for a duration of 3 m, and then a 90% load with a ramp-up period of 45 s for a duration of 2 m. As shown, the load test system 106 may run the load tests with an unlimited number of segments (constrained only by available system resources). Likewise, the load test system 106 may run an unlimited number of simultaneous load test scripts (as discussed above). Unlike conventional systems, the load test system 106 is not limited increasing the load percentage metric 554 on each subsequent segment (e.g., ramp up)—in contrast, the load test system 106 may allow input values that increase and/or decrease the load percentage metric 554 for each segment without restriction when running the load test.

As illustrated in FIG. 5D, the load test system 106 graphical user interface 502d includes fields for executing a load test and viewing the results of the load tests. As shown, the load test system 106 can present information based on the load test ID 560, such as the load test report 562, and load test information 564 (e.g., load test artifacts, execution date, execution time, load test user, and load test state). Additionally, the load test system 106 provides, for display within the graphical user interface 502c, action options 566 that allow the computing device 500 to repeat a load test with a simple interface.

As illustrated in FIG. 5E, the load test system 106 provides, for display within the graphical user interface 502e, textual and/or visual representations of the results of the load tests. The results can include report information, APDEX scores, request summaries, statistics (e.g., total requests, executions, attempts, failures, error percentage, response times (including, min, max, median, average, percentile), response time, and throughput).

Indeed, as shown in FIG. 5E, the load test system 106 provides test and report information 570 including the source file name, load test start time, load test end time, and any filters for the display. Further, the load test system 106 provides APDEXresponse times 572 for the load test. Additionally, the load test system 106 provides a requests summary 574 showing the percentage pass rate of the load test. Further, the load test system 106 provides statistics 576 comprising values including the total system requests, execution failures, execution errors, throughput values, network response statistics. Additionally, the load test system 106 provides response times over time 578 including the average, minimum, maximum, median, and percentile response times. Further, the load test system 106 provides the successful responses and response time percentiles over time 580.

Figure 5F:
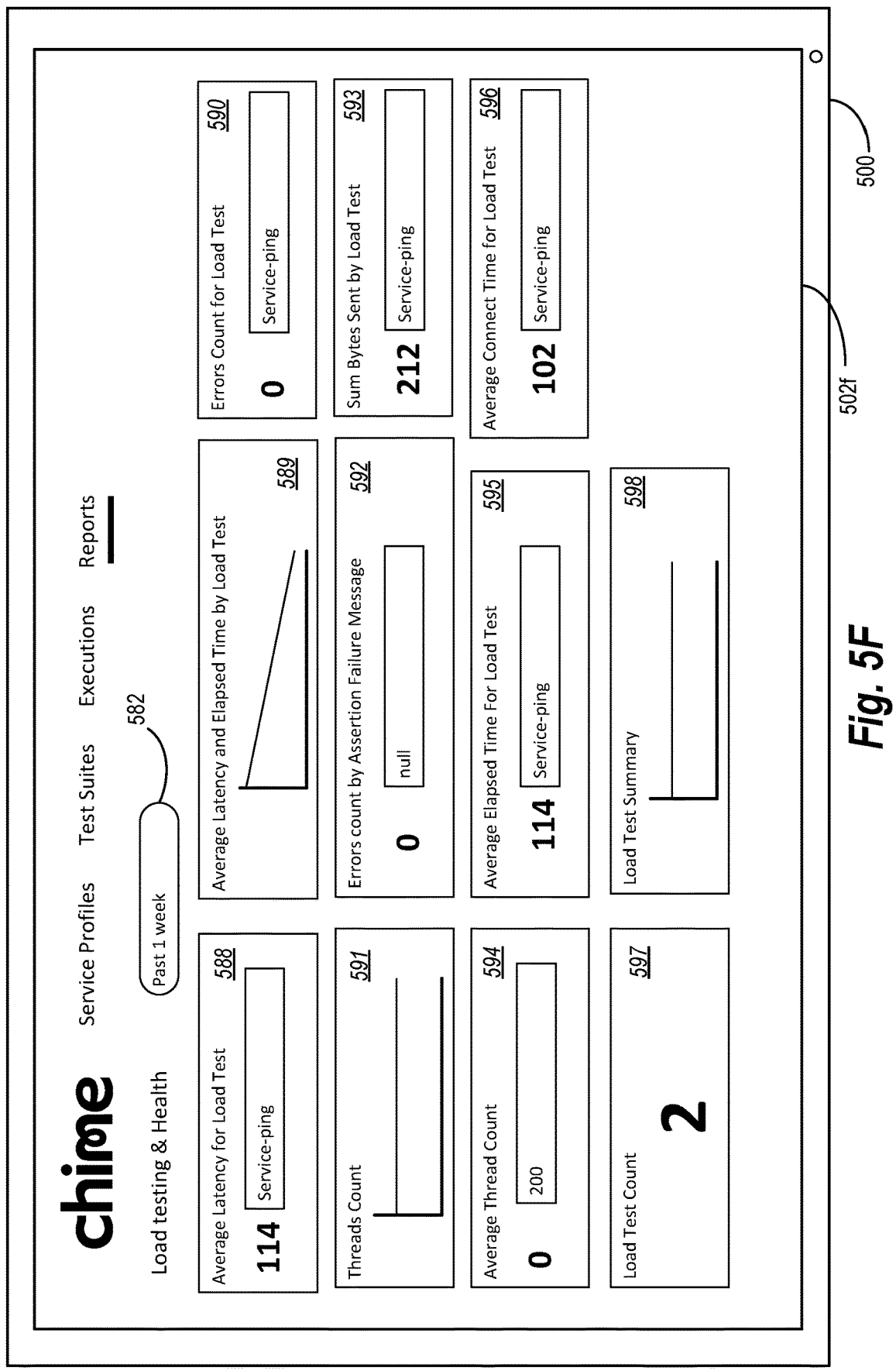

As further shown in FIG. 5F, the load test system 106 graphical user interface 502f may provide textual and/or visual representations of the results of the load tests for a specified time period 582. Example values that could be represented include average latency, average elapsed time, error count, bytes sent, thread count, average thread count, average elapsed time, average connect time, load test count, and load test summary.

Indeed, the load test system 106 provides real-time updates of the degree to which the target computing system passes or fails the load test. For example, the load test system 106 provides the average latency for the load test 588 and the average latency and elapsed time taken by the load test 589. Additionally, the load test system 106 provides the errors count for the load test 590 and the errors count by assertion failure message 592. The load test system 106 provides the threads count 591 and the average thread count 594 used by the load test. Additionally, the load test system 106 provides the sum bytes sent by the load test 593. Further, the load test system 106 provides the elapsed time for the load test 595, the average connect time for the load test 596, the load test count 597, and the load test summary 598.

Figure 6:
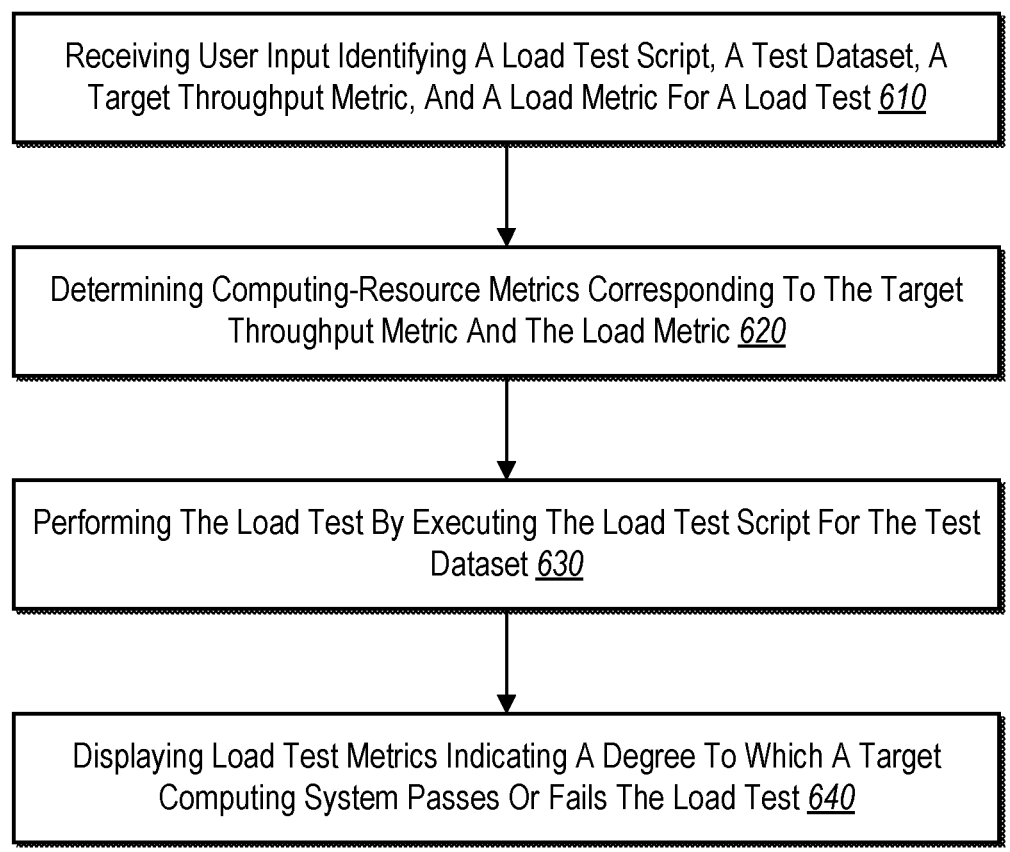
FIG. 6 illustrates a flowchart of a series of acts for performing a load test in accordance with one or more embodiments.

FIGS. 1-5F, the corresponding text, and the examples provide a number of different methods, systems, devices, and non-transitory computer-readable media of the load test system 106. In addition to the foregoing, one or more embodiments can also be described in terms of flowcharts comprising acts for accomplishing a particular result, as shown in FIG. 6. FIG. 6 may 6 may be performed with more or fewer acts. Further, the acts may be performed in differing orders. Additionally, the acts described herein may be repeated or performed in parallel with one another or parallel with different instances of the same or similar acts.

As mentioned, FIG. 6 illustrates a flowchart of a series of acts 600 for the load test system 106 in accordance with one or more embodiments. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer-readable medium can comprise instructions that, when executed by one or more processors, cause a computing device to perform the acts of FIG. 6. In some embodiments, the load test system 106 can perform the acts of FIG. 6.

FIG. 6 illustrates a flowchart of a series of acts 600 for running a load test in accordance with one or more embodiments. The series of acts 600 includes an act 610 of receiving user input identifying a load test script, a test dataset, a target throughput metric, and a load metric for a load test. In some embodiments, the act 610 comprises receiving addition user input identifying additional load metrics, ramp-up times, and durations allowing the load test system 106 to run segments of the load test with different metrics. In some embodiments, the act 620 is limited to receiving user input identifying the load test script, the test dataset, the target throughput metric, and the load metric for the load test without further user input identifying one or more of the computing-resource metrics.

The series of acts 600 further includes an act 620 of determining computing-resource metrics (e.g., number of threads for the load test, number of cores for the load test, amount of memory for the load test) corresponding to the target throughput metric and the load metric. In some embodiments, the act 620 further includes identifying a model of traffic data patterns for user interactions with the target computing system for a target time period. In some embodiments, the act 620 further includes performing multiple load tests in parallel or in serial using leader worker agents and server worker agents.

The series of acts 600 further includes the act 630 of performing the load test by executing the load test script for the test dataset. In some embodiments the act 620 further includes receiving user input identifying a minimum target system response time and terminating the load test based on the failure to obtain the minimum target system response time. In some embodiments the act 620 further includes determining one or more system resources (e.g., threads, processes, cores, memory) that were used for performing the load test and terminating the one or more system resources at a predetermined time after the load test has completed.

The series of acts 600 further includes the act 640 of displaying load test metrics indicating a degree to which a target computing system passes or fails the load test. In some embodiments the act 640 further includes providing and or displaying real-time updates of the load-test metrics indicating a degree to which the target computing system passes or fails the load test.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 7:
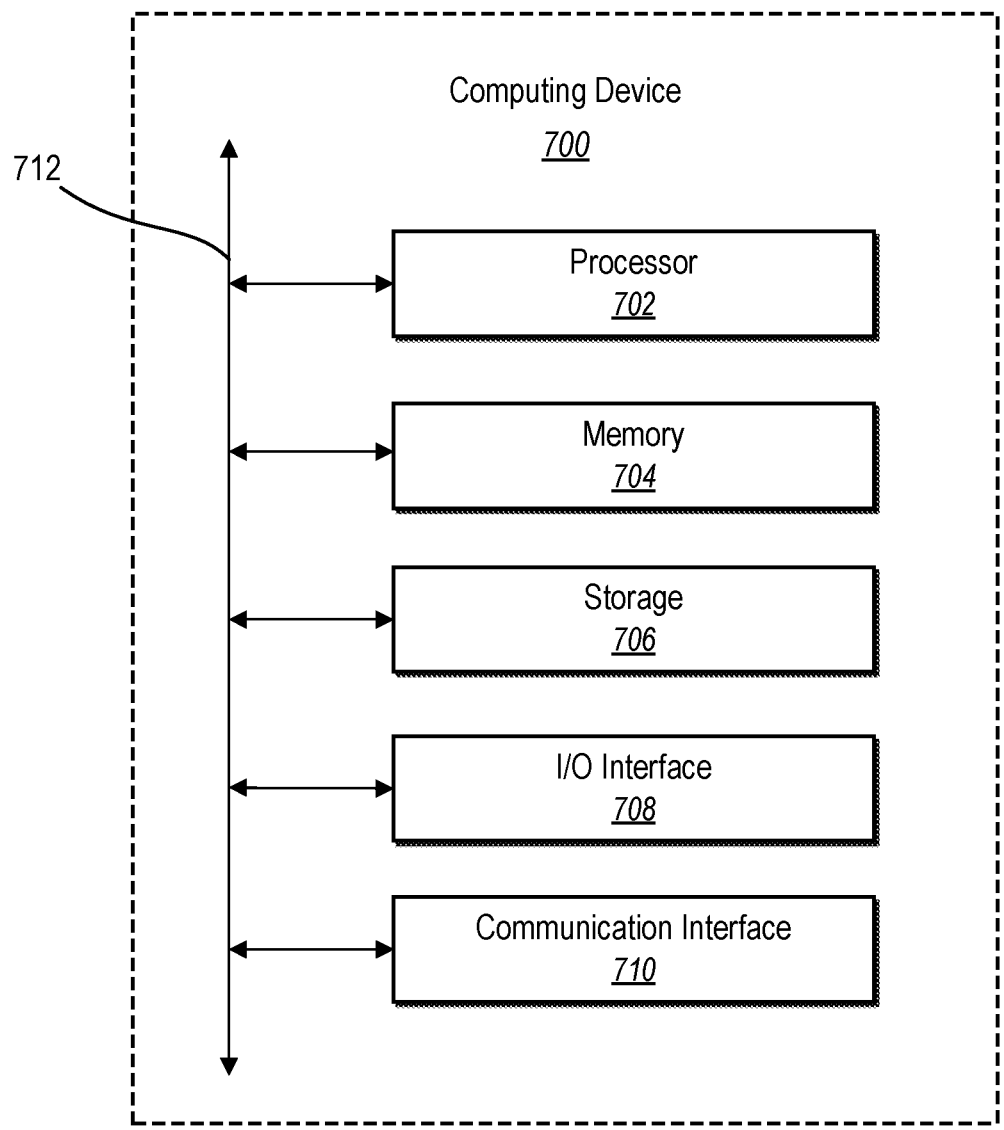
FIG. 7 illustrates a block diagram of an example computing device for implementing one or more embodiments of the present disclosure.

FIG. 7 illustrates, in block diagram form, an exemplary computing device 700 that may be configured to perform one or more of the processes described above. One will appreciate that the load test system 106 (or the inter-network facilitation system 104) can comprise implementations of a computing device, including, but not limited to, the devices or systems illustrated in the previous figures. As shown by FIG. 7, the computing device can comprise a processor 702, memory 704, a storage device 706, an I/O interface 708, and a communication interface 710. In certain embodiments, the computing device 700 can include fewer or more components than those shown in FIG. 7. Components of computing device 700 shown in FIG. 7 will now be described in additional detail.

In particular embodiments, processor(s) 702 includes hardware for executing instructions, such as those making up a computer program. As an example, and not by way of limitation, to execute instructions, processor(s) 702 may retrieve (or fetch) the instructions from an internal register, an internal cache, memory 704, or a storage device 706 and decode and execute them.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 704 may be internal or distributed memory.

The computing device 700 includes a storage device 706 includes storage for storing data or instructions. As an example, and not by way of limitation, storage device 706 can comprise a non-transitory storage medium described above. The storage device 706 may include a hard disk drive ("HDD"), flash memory, a Universal Serial Bus ("USB") drive or a combination of these or other storage devices.

The computing device 700 also includes one or more input or output ("I/O") interface 708, which are provided to allow a user (e.g., requester or provider) to provide input to (such as user strokes), receive output from, and otherwise transfer data to and from the computing device 700. These I/O interface 708 may include a mouse, keypad or a keyboard, a touch screen, camera, optical scanner, network interface, modem, other known I/O devices or a combination of such I/O interface 708. The touch screen may be activated with a stylus or a finger.

The I/O interface 708 may include one or more devices for presenting output to a user, including, but not limited to, a graphics engine, a display (e.g., a display screen), one or more output providers (e.g., display providers), one or more audio speakers, and one or more audio providers. In certain embodiments, the I/O interface 708 is configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 can provide one or more interfaces for communication (such as, for example, packet-based communication) between the computing device and one or more other computing devices 700 or one or more networks. As an example, and not by way of limitation, communication interface 710 may include a network interface controller ("NIC") or network adapter for communicating with an Ethernet or other wire-based network or a wireless NIC ("WNIC") or wireless adapter for communicating with a wireless network, such as a WI-FI. The computing device 700 can further include a bus 712. The bus 712 can comprise hardware, software, or both that couples components of computing device 700 to each other.

Figure 8:
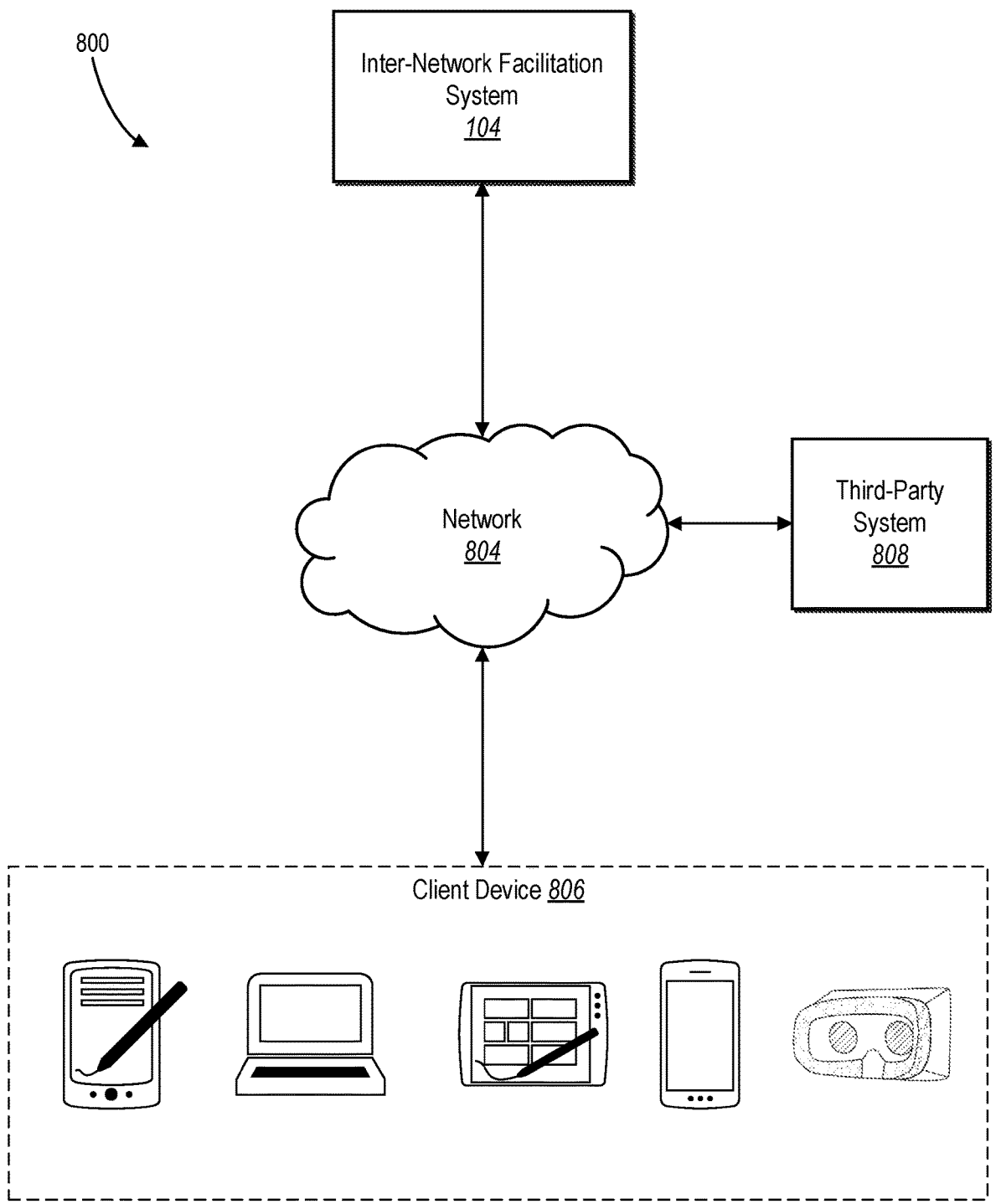
FIG. 8 illustrates a network environment of a load test system in accordance with one or more embodiments.

FIG. 8 illustrates an example network environment 800 of the inter-network facilitation system 104. The network environment 800 includes a client device 806 (e.g., client device(s) 112), an inter-network facilitation system 104, and a third-party system 808 connected to each other by a network 804. Although FIG. 8 illustrates a particular arrangement of the client device 806, the inter-network facilitation system 104, the third-party system 808, and the network 804, this disclosure contemplates any suitable arrangement of client device 806, the inter-network facilitation system 104, the third-party system 808, and the network 804. As an example, and not by way of limitation, two or more of client device 806, the inter-network facilitation system 104, and the third-party system 808 communicate directly, bypassing network 804. As another example, two or more of client device 806, the inter-network facilitation system 104, and the third-party system 808 may be physically or logically co-located with each other in whole or in part.

Moreover, although FIG. 8 illustrates a particular number of client devices 806, inter-network facilitation system 104, third-party systems 808, and networks 804, this disclosure contemplates any suitable number of client devices 806, inter-network facilitation system 104, third-party systems 808, and networks 804. As an example, and not by way of limitation, network environment 800 may include multiple client devices 806, inter-network facilitation system 104, third-party systems 808, and/or networks 804.

This disclosure contemplates any suitable network 804. As an example, and not by way of limitation, one or more portions of network 804 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 804 may include one or more networks 804.

Links may connect client device 806, inter-network facilitation system 104 (e.g., which hosts the load test system 106), and third-party system 808 to network 804 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, the client device 806 may be an electronic device including hardware, software, or embedded logic components or a combination of two or more such components and capable of carrying out the appropriate functionalities implemented or supported by client device 806. As an example, and not by way of limitation, a client device 806 may include any of the computing devices discussed above in relation to FIG. 8. A client device 806 may enable a network user at the client device 806 to access network 804. A client device 806 may enable its user to communicate with other users at other client devices 806.

In particular embodiments, the client device 806 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 806 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 806 one or more Hyper Text Markup Language ("HTML") files responsive to the HTTP request. The client device 806 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 804) to link the third-party-system 808. For example, the inter-network facilitation system 104 may receive authentication credentials from a user to link a third-party system 808 such as an online bank account, credit account, debit account, or other financial account to a user account within the inter-network facilitation system 104. The inter-network facilitation system 104 can subsequently communicate with the third-party system 808 to detect or identify balances, transactions, withdrawal, transfers, deposits, credits, debits, or other transaction types associated with the third-party system 808. The inter-network facilitation system 104 can further provide the aforementioned or other financial information associated with the third-party system 808 for display via the client device 806. In some cases, the inter-network facilitation system 104 links more than one third-party system 808, receiving account information for accounts associated with each respective third-party system 808 and performing operations or transactions between the different systems via authorized network connections.

In particular embodiments, the inter-network facilitation system 104 may interface between an online banking system and a credit processing system via the network 804. For example, the inter-network facilitation system 104 can provide access to a bank account of a third-party system 808 and linked to a user account within the inter-network facilitation system 104. Indeed, the inter-network facilitation system 104 can facilitate access to, and transactions to and from, the bank account of the third-party system 808 via a client application of the inter-network facilitation system 104 on the client device 806. The inter-network facilitation system 104 can also communicate with a credit processing system, an ATM system, and/or other financial systems (e.g., via the network 804) to authorize and process credit charges to a credit account, perform ATM transactions, perform transfers (or other transactions) across accounts of different third-party systems 808, and to present corresponding information via the client device 806.

In particular embodiments, the inter-network facilitation system 104 includes a model for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 808), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 800 either directly or via network 804. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 806, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 804.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 806. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 806. Information may be pushed to a client device 806 as notifications, or information may be pulled from client device 806 responsive to a request received from client device 806. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 806 associated with users.

In addition, the third-party system 808 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 804. A third-party system 808 can communicate with the inter-network facilitation system 104 to provide financial information pertaining to balances, transactions, and other information, whereupon the inter-network facilitation system 104 can provide corresponding information for display via the client device 806. In particular embodiments, a third-party system 808 communicates with the inter-network facilitation system 104 to update account balances, transaction histories, credit usage, and other internal information of the inter-network facilitation system 104 and/or the third-party system 808 based on user interaction with the inter-network facilitation system 104 (e.g., via the client device 806). Indeed, the inter-network facilitation system 104 can synchronize information across one or more third-party systems 808 to reflect accurate account information (e.g., balances, transactions, etc.) across one or more networked systems, including instances where a transaction (e.g., a transfer) from one third-party system 808 affects another third-party system 808.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
receiving, via a graphical user interface, user input identifying a load test script for a load test, a test dataset for the load test, a target throughput metric quantifying a target throughout for the load test, and a load metric quantifying a target computational load for the load test, without receiving further user input identifying one or more computing-resource metrics;
determining, in response to the user input, computing-resource metrics comprising values for computer resources, wherein the computing-resource metrics are determined based on the target throughput metric and the load metric;

identifying a model of traffic data patterns for user interactions with a target computing system at a target time period;

performing the load test according to the identified model of traffic patterns by executing the load test script for the test dataset based on the target throughput metric, the load metric, and the computing-resource metrics; and providing, for display on the graphical user interface, real-time updates of load test metrics indicating a degree to which the target computing system passes or fails the load test.

2. The computer-implemented method of claim 1, further comprising:

receiving, via the graphical user interface, additional user input specifying a duration for performing a segment of the load test according to the load metric;

receiving, via the graphical user interface, further user input specifying an additional load metric and an additional duration for performing an additional segment of the load test according to the additional load metric; and performing the segment of the load test for the duration according to the load metric and the additional segment of the load test for the additional duration according to the additional load metric.

3. The computer-implemented method of claim 1, further comprising:

receiving, via the graphical user interface, user input identifying at least one target test environment from a set of test environments; and determining, in response to the user input, the computing-resource metrics for the at least one target test environment.

4. The computer-implemented method of claim 1, further comprising:

identifying the model of traffic data patterns for the user interactions with the target computing system at the target time period by identifying quantity of users and a stem usage pattern; and performing the load test according to the identified model of traffic patterns.

5. The computer-implemented method of claim 1, wherein receiving the user input identifying the target throughput metric comprises receiving, via the graphical user interface, user input identifying a minimum target system response time;

wherein the computer-implemented method further comprises terminating the load test based on failure to obtain the minimum target system response time.

6. The computer-implemented method of claim 1, further comprising:

determining one or more load test threads that were used for performing the load test; and terminating the one or more load test threads at a predetermined time after the load test has completed.

7. The computer-implemented method of claim 1, wherein the computing-resource metrics comprise one or more of:

a number of threads for the load test;
a number of cores for the load test; or
an amount of memory for the load test.

8. The computer-implemented method of claim 7, further comprising determining the computing-resource metrics in real time based on receiving the user input identifying the load test script, the test dataset, the target throughput metric.

9. The computer-implemented method of claim 1, further comprising:

performing multiple load tests in parallel using leader worker agents and server worker agents.

10. The computer-implemented method of claim 1, further comprising providing, for display on the graphical user interface, the real-time updates of the load test metrics indicating a degree to which the target computing system passes or fails the load test comprising an error count.

11. A non-transitory computer-readable medium storing instructions that, when executed by at least one processor, cause a computing device to:

receive a user request, via a graphical user interface, to identify a load test script for a load test, a test dataset for the load test, a target throughput metric quantifying a target throughput for the load test, and a load metric quantifying a target computational load for the load test, without receiving further user input identifying one or more computing-resource metrics;

determine, in response to the user request, computing-resource metrics comprising values for computer resources, wherein the computing-resource metrics are determined based on the target throughput metric and the load metric;

identify a model of traffic data patterns for user interactions with a target computing system at a target time period;

perform the load test according to the identified model of traffic patterns by executing the load test script for the test dataset based on the target throughput metric, the load metric, and the computing-resource metrics; and provide, for display on the graphical user interface, real-time updates of load-test metrics indicating a degree to which the target computing system passes or fails the load test.

12. The non-transitory computer-readable medium of claim 11, further comprising instructions that, when executed by the at least one processor, cause the computing device to:

receive a user request, via the graphical user interface, to specify a duration for performing a segment of the load test according to the load metric;

receive an additional user request, via the graphical user interface, to specify an additional load metric and an additional duration for performing an additional segment of the load test according to the additional load metric; and perform the segment of the load test for the duration according to the load metric and the additional segment of load test for the additional duration according to the additional load metric.

13. The non-transitory computer-readable medium of claim 11, further comprising instructions that, when executed by the at least one processor, cause the computing device to:

receive user input, via the graphical user interface, to identify at least one target test environment from a set of test environments; and determine, in response to the user input, the computing-resource metrics for the at least one target test environment.

14. The non-transitory computer-readable medium of claim 11, further comprising instructions that, when executed by the at least one processor, cause the computing device to:

identify the model of traffic data patterns for the user interactions with the target computing system at the target time period by identifying a system usage pattern; and perform the load test according to the identified model of traffic patterns.

15. The non-transitory computer-readable medium of claim 11, further comprising instructions that, when executed by the at least one processor, cause the computing device to:

determine one or more load test threads that were used for performing the load test; and terminate the one or more load test threads at a predetermined time after the load test has completed.

16. A system comprising:

at least one processor; and at least one non-transitory computer-readable storage medium storing instructions that, when executed by at least one processor, cause the system to:

receive a user request, via a graphical user interface, to identify a load test script for a load test, a test dataset for the load test, a target throughput metric quantifying a target throughput for the load test, and a load metric quantifying a target computational load for the load test, without receiving further user input identifying one or more computing-resource metrics;

determine, in response to the user request, computing-resource metrics comprising values for computer resources, wherein the computing-resource metrics are determined based on the target throughput metric and the load metric;

identify a model of traffic data patterns for user interactions with a target computing system at a target time period;

perform the load test according to the identified model of traffic patterns by executing the load test script for the test dataset based on the target throughput metric, the load metric, and the computing-resource metrics; and provide, for display on the graphical user interface, real-time updates of load-test metrics indicating a degree to which the target computing system passes or fails the load test.

17. The system of claim 16, further comprising instructions that, when executed by the at least one processor, cause the system to:

receive a user request, via the graphical user interface, to specify a duration for performing a segment of the load test according to the load metric;

receive an additional user request, via the graphical user interface, to specify an additional load metric and an additional duration for performing an additional segment of the load test according to the additional load metric; and perform the segment of the load test for the duration according to the load metric and the additional segment of load test for the additional duration according to the additional load metric.

18. The system of claim 16, further comprising instructions that, when executed by the at least one processor, cause the system to:

receive user input, via the graphical user interface, to identify at least one target test environment from a set of test environments; and determine, in response to the user input, the computing-resource metrics for the at least one target test environment.

19. The system of claim 16, further comprising instructions that, when executed by the at least one processor, cause the system to:

identify the model of traffic data patterns for the user interactions with the target computing system at the target time period by identifying a quantity of users; and perform the load test according to the identified model of traffic patterns.

20. The system of claim 16, further comprising instructions that, when executed by the at least one processor, cause the system to:

determine one or more load test threads that were used for performing the load test; and terminate the one or more load test threads at a predetermined time after the load test has completed.

* * * * *